US00RE34437E

United States Patent [19]

Ariyama et al.

[11] E Patent Number: Re. 34,437

[45] Reissued Date of Patent: Nov. 9, 1993

[54] APPARATUS FOR FORMING MULTICOLOR ELECTROPHOTOGRAPHIC IMAGES THROUGH WET-TYPE DEVELOPING PROCESS

[75] Inventors: Kenzo Ariyama, Kasuigai; Tsuneo Kurotori, Tokyo; Manabu Mochizuki, Yokohama, all of Japan

[73] Assignee: Ricoh Company, Ltd., Tokyo, Japan

[21] Appl. No.: 306,609

[22] Filed: Feb. 3, 1989

Related U.S. Patent Documents

Reissue of:

[64] Patent No.: 4,640,605
Issued: Feb. 3, 1987
Appl. No.: 783,025
Filed: Oct. 2, 1985

[30] Foreign Application Priority Data

| | | | |
|---|---|---|---|
| Oct. 2, 1984 | [JP] | Japan | 59-149485[U] |
| Nov. 9, 1984 | [JP] | Japan | 59-236229 |
| Nov. 9, 1984 | [JP] | Japan | 59-236230 |
| Nov. 9, 1984 | [JP] | Japan | 59-236231 |
| Dec. 24, 1984 | [JP] | Japan | 59-272588 |

[51] Int. Cl.[5] ..... G03G 15/01; G03G 15/06

[52] U.S. Cl. ..... 355/307; 355/256; 118/645; 430/42

[58] Field of Search ..... 355/256, 257, 258, 300; 118/645, 659, 660; 430/42

[56] References Cited

U.S. PATENT DOCUMENTS

| | | | |
|---|---|---|---|
| 4,176,940 | 12/1979 | Katakabe et al. | 355/256 |
| 4,193,683 | 3/1980 | Langner | 355/256 |
| 4,449,475 | 5/1984 | Schinke | 355/257 X |
| 4,456,367 | 6/1984 | Szymanski et al. | 355/256 |

*Primary Examiner*—Arthur C. Prescott
*Attorney, Agent, or Firm*—Guy W. Shoup; Eliot S. Gerber; Leighton K. Chong

[57] ABSTRACT

An apparatus for forming multicolor electrophotographic images through a wet-type developing process has charging, exposure, development, transfer, and cleaning devices disposed around a rotatable latent image carrier. The development device has at least one roller disposed in confronting relation to the latent image carrier, and a development housing in which the roller is rotatably disposed. During the developing process, the development device is supplied with a desired one of liquid developers of different colors stored in respective liquid developer tanks.

49 Claims, 13 Drawing Sheets

APPARATUS FOR FORMING MULTICOLOR ELECTROPHOTOGRAPHIC IMAGES THROUGH WET-TYPE DEVELOPING PROCESS

Matter enclosed in heavy brackets [ ] appears in the original patent but forms no part of this reissue specification; matter printed in italics indicates the additions made by reissue.

*This application is a reissue application for U.S. Pat. No. 4,640,605.*

BACKGROUND OF THE INVENTION

The present invention relates to an apparatus for forming multicolor electrophotographic images by employing a wet-type developing process.

Conventional apparatus for forming multicolor electrophotographic images through the wet-type developing process have as many developing devices as the number of the colors of developers, the developing devices employing dish-shaped development electrodes. The developing device having such a dish-shaped development electrode is disclosed in Japanese Patent Publication No. 56-16424 (Japanese Laid-Open Patent Publication No. 50-17844), Japanese Patent Publication No. 54-43898 (Japanese Laid-Open Patent Publication No. 50-17843), Japanese Laid-Open Patent Publication No. 52-82241, Japanese Patent Publication No. 58-32376 (Japanese Laid-Open Patent Publication No. 51-78335), Japanese Laid-Open Patent Publication No. 53-26137, and Japanese Laid-Open Patent Publication No. 53-53334, for example. Where the dish-shaped electrode is used, difficulty has been experienced in maintaining a desired gap between itself and a latent image carrier or photosensitive drum, and toner tends to get attached to the photosensitive drum when the electrode is cleaned. Therefore, the cleaning device operates under an increased burden, and the toner is consumed and degraded at a high rate. Another problem is that the image forming apparatus is large in size since it has as many developing devices as there are developers required. The developing system employing the dish-shaped electrode does not have a means such as a scraper for mechanically removing the developer which has been returned to the dish-shaped electrode under a developing bias to clear the image background. Therefore, the developer is transferred back to the photosensitive drum by applying a reverse bias, and the developer is then removed from the photosensitive drum by the cleaning device. The amount of developer to be removed by the cleaning device is however quite large. If the developer were returned to a developer tank, then the amount of the toner which has been degraded by the reverse bias would be increased, and there would eventually arise the problem of color mixing. To avoid such drawbacks, the collected developer should not be recycled, thus resulting in increased toner consumption.

For developing fully colored images, it is necessary to suppress the edge effect so as to attain desired hues by superposing the colors. Although it would be preferable to locate the development electrode closely to the photosensitive drum to meet the above requirement, positioning the dish-shaped development element closely to the photosensitive drum would permit the liquid developer to leak due to capillary action, thus causing color mixing. Therefore, the dish-shaped development electrode could not be positioned closely to the photosensitive drum.

SUMMARY OF THE INVENTION

It is an object of the present invention to provide an apparatus for forming multicolor electrophotographic images through a wet-type developing process, the apparatus having a rotatable body capable of providing a stable electrode effect and reducing the burden imposed on a cleaning device.

The above object can be achieved by an apparatus for forming multicolor electrophotographic images through a wet-type developing process, the apparatus including a latent image carrier, a rotatable development body disposed adjacent to the latent image carrier and rotatable in one direction for supplying a developer to the latent image carrier to visualizing a latent image formed on the latent image carrier, a development housing in which the rotatable development body is rotatably accommodated, a plurality of developer tanks for storing developers of different colors, respectively, and developer supply means for selectively supplying the developer from one of the developer tanks to the development housing and for returning the developer having developed the image to said one of said the developer tanks.

The developer can more fully be removed from the rotatable development body by a scraper or the like that can be disposed in association with the rotatable development body. Therefore, when a developer of different color is employed, the amount of the previously used remanent developer which might be mixed into the newly used developer in the developer tank is extremely small, resulting in a highly reduced degree of color mixing.

A developing bias may be applied to collect or retrieve the developer of one color onto the rotatable development body, from which the developer can be removed by the scraper or the like and returned to its developer tank. This arrangement is advantageous for preventing color mixing and reducing toner consumption.

Since the developer can effectively be removed from the rotatable development body by the scraper of the like, the rotatable development body can be positioned closely to the latent image carrier or photosensitive drum, so that the edge effect can be reduced as much as possible for a greater color effect.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 7:
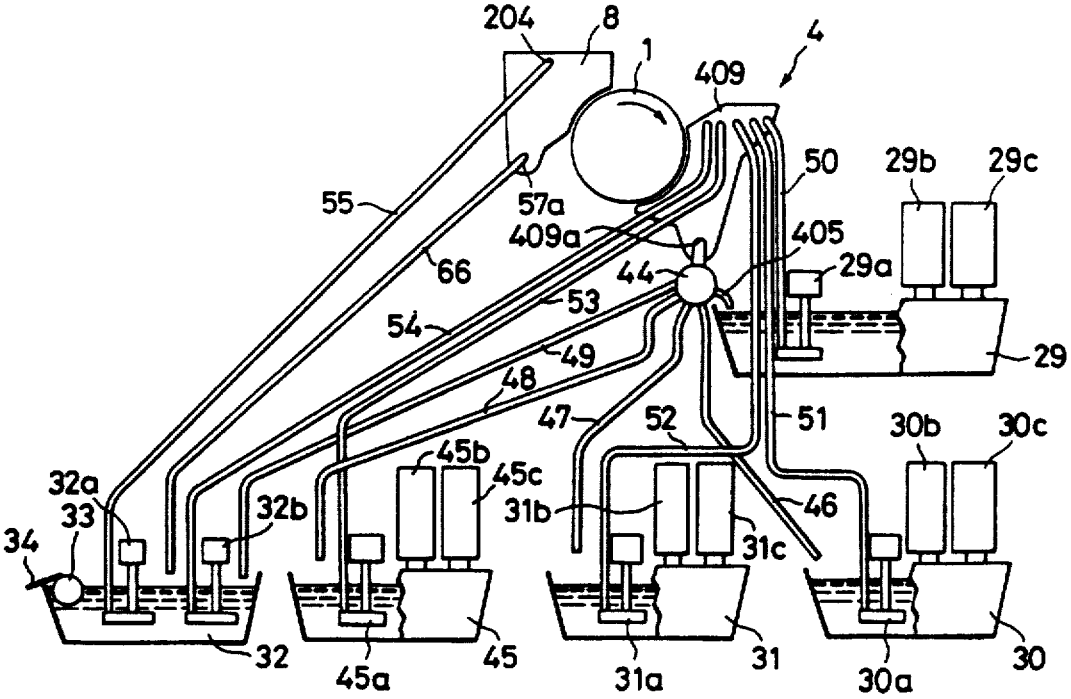
FIG. 7 is a side elevational view, partly cut away, of a pipe system by which developer containers, a cleaning device, and a cleaning solution tank.

1. General arrangement of overall image forming apparatus: (FIGS. 1, 2 and 7)

Figure 1:
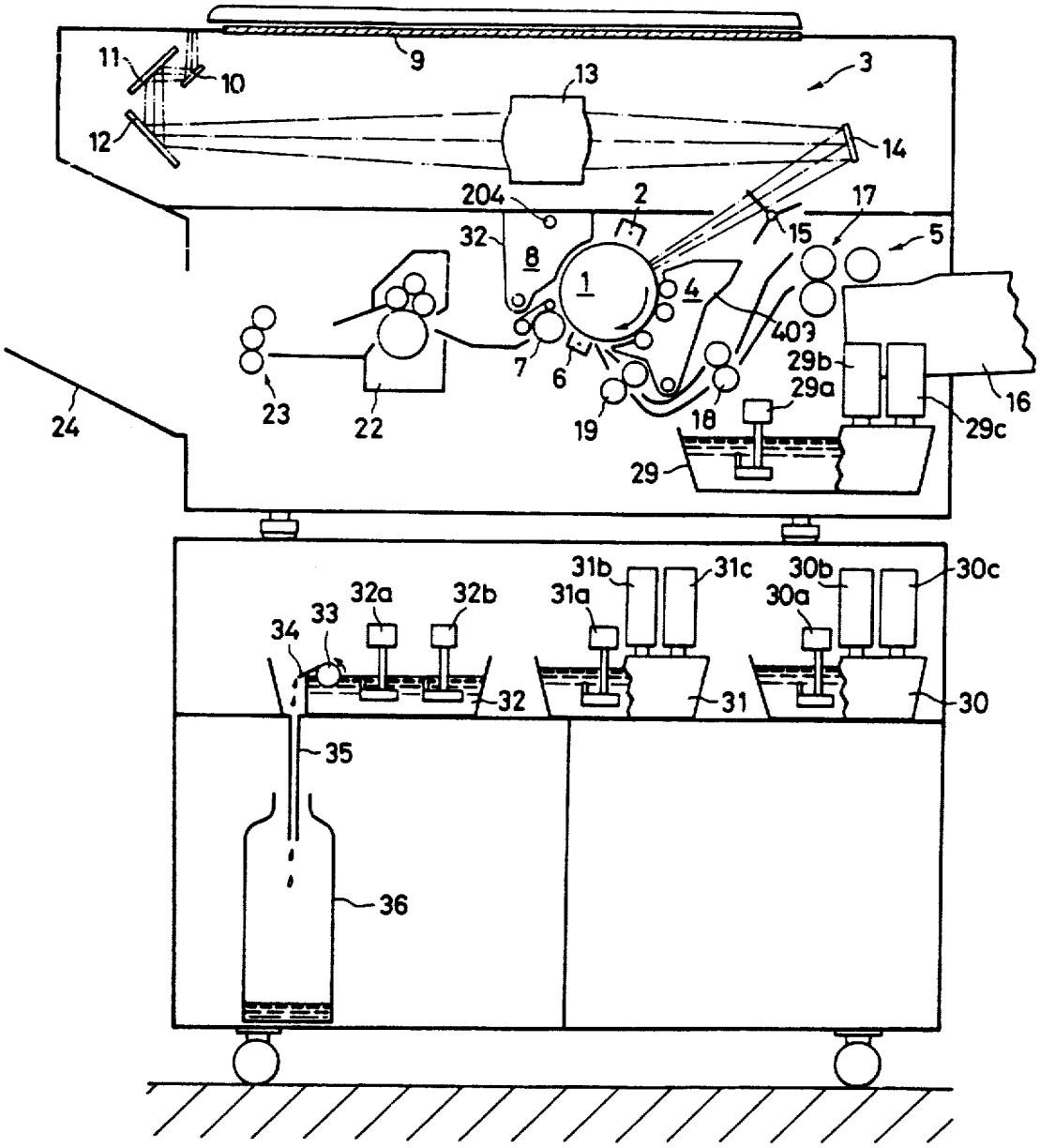
FIG. 1 is a side elevational view, partly broken away, of an apparatus for developing multicolor electrophotograhic images through a wet-type developing process, according to the present invention.
Figure 2:
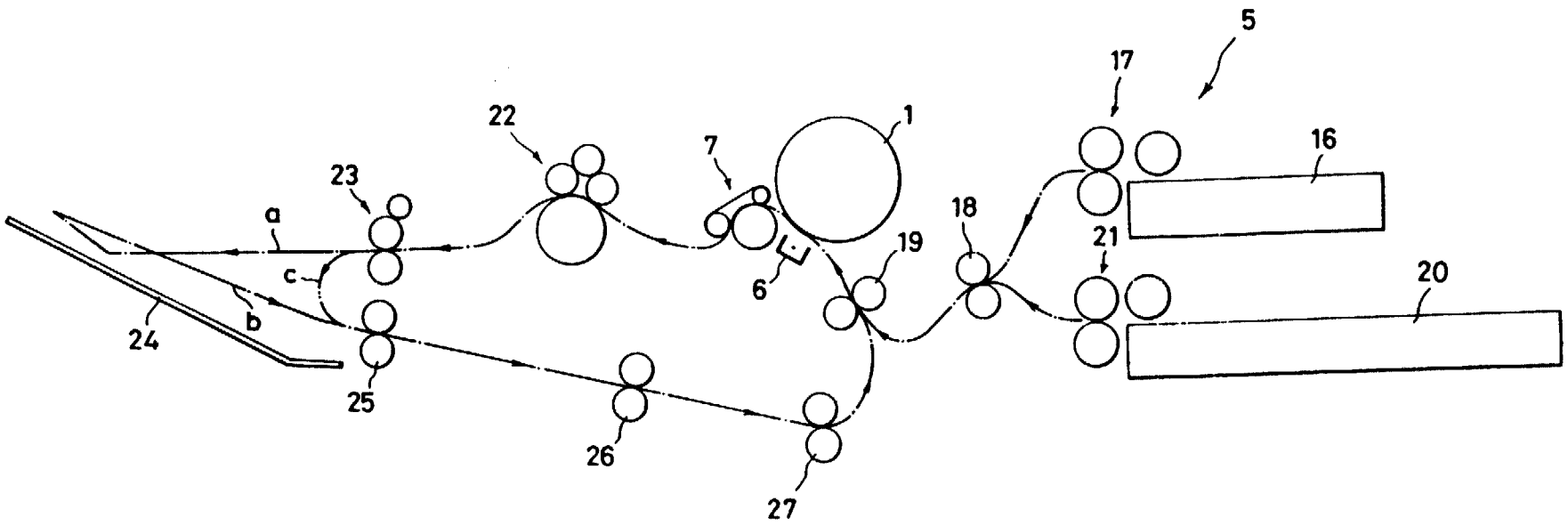
FIG. 2 is a side elevational view showing the path of travel of an image transfer sheet.

FIG. 1 shows an image forming apparatus having a photosensitive drum 1 serving as a latent image carrier. Around the photosensitive drum 1, there are disposed a charger 2 for charging the photosensitive drum 1 at a certain polarity, an optical system 3 for forming an electrostatic latent image on the photosensitive drum 1, a development device 4 for developing the electrostatic latent image into a visible image, a sheet feeder 5 for feeding an image transfer sheet to which the visible image is to be transferred from the photosensitive drum 1, a charger 6 for transferring the visible image to the image transfer sheet, a separator 7 for separating the image transfer sheet with the visible image thereon from the photosensitive drum 1, and a cleaning device 8 for cleaning the photosensitive drum surface after the visible image has been transferred therefrom.

The optical system 3 comprises an original document table 9 on which an original document to be copied is to be placed, first through third movable mirrors 10, 11, 12, a projector lens 13, a fixed mirror 14, and a filter 15. As shown in FIG. 2, the sheet feeder 5 is composed of a sheet cassette 16, a feed mechanism 17 for separating and feeding image transfer sheets one by one from the sheet cassette 16, a pair of feed rollers 18, a pair of register rollers 19, another sheet cassette 20, and a feed mechanism 21 for separating and feeding image transfer sheets one by one from the sheet cassette 20. The register rollers 19 serve to feed an image transfer sheet in synchronism with rotation of the photosensitive drum 1. The visible image transferred to the image transfer sheet is fixed thereto by a fixing device 22. The image transfer sheet with the visible image fixed thereto is then discharged by a pair of discharge rollers 23 into a sheet tray 24. The image forming apparatus of the invention is capable of reproducing monochromatic or multicolor images on one or both sides of a sheet. For producing fully colored or double-sided copies, the image forming apparatus has an additional sheet feed path including roller pairs 25, 26, 27 as described in detail later on.

Figure 4:
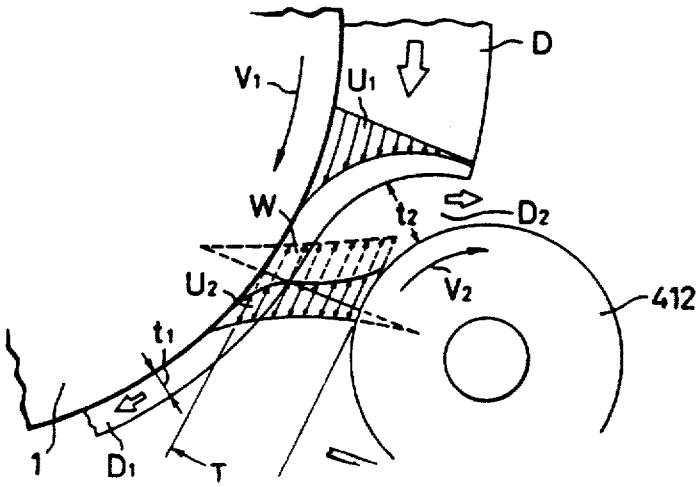
FIG. 4 is a fragmentary side elevational view showing the principle of removing an excess liquid developer with a squeeze roller in the development device.

As illustrated in FIG. 4, the development device 4 includes a development housing 409 disposed closely to the photosensitive drum 1 with rotatable development bodies rotatably accommodated in the development housing 409. The development housing 409 is supplied with a liquid developer selectively from a developer tank 29 storing a black liquid developer, a developer tank 30 storing a magenta liquid developer, a developer tank 31 storing a cyan liquid developer, and a developer tank 45 (FIG. 7) storing a yellow liquid developer. Developer supply means such as pumps 29a, 30a, 31a, 45a are associated respectively with the developer tanks 29, 30, 31, 45 for supplying the liquid developers to the development housing 409. The developer tanks 29, 30, 31, 45 also have toner bottles 29b, 30b, 31b, 45b, respectively, which contain ink toners of the respective colors, and solvent tanks 29c, 30c, 31c, 45c, respectively, which contain a solvent serving as a toner carrier or vehicle. The liquid developer in the development housing 409 will be returned to the developer tank from which it has been supplied.

The cleaning device 8 serves to clean the surface of the photosensitive drum 1 with a cleaning solution supplied from a cleaning solution tank 32. The cleaning solution stored in the cleaning solution tank 32 is of the same composition as that of the solvent or toner carrier. In the illustrated embodiment, the cleaning solution tank 32 has two pumps 32a, 32b. As shown in FIG. 7, the pump 32a operates to supply the cleaning solution through a supply pipe 55 to the cleaning device 8, and the pump 32b operates to supply the cleaning solution via a supply pipe 54 to the development housing 409, at timings which will be described later. The cleaning solution tank 32 also has an electrode roller 33 for attracting the toner recovered by cleaning the photosensitive drum 1. A blade 34 is held against the electrode roller 33 for scrapping the reclaimed toner off the roller 33. The scraped toner is collected in a collection container 36 through a pipe 35 (FIG. 1).

2. Development device: (FIGS. 3 through 6)

The development device 4 is disposed alongside of the photosensitive drum 1. The development device 4 generally comprises the development housing 409, first and second development rollers 410, 411 and a squeeze roller 412 rotatably supported in the development housing 409 and drivable to rotate in the direction of the arrows about their own axes, and a nozzle 413 connected to the developer tanks and the pumps for supplying a selected liquid developer to the first development roller 410. Scrapers 414, 415, 416 fixed at ends thereof to the development housing 409 have the opposite distal ends held against the rollers 410, 411, 412, respectively. The liquid developer, denoted at D, supplied from the nozzle 413 is distributed or scattered in the axial direction of the rollers by a buffer 417 and then supplied by the first development roller 410 to the circumferential surface of the photosensitive drum 1 for visualizing a latent image formed thereon. The liquid developer attached to the first development roller 410 is removed therefrom by the scraper 414. The liquid developer D is also supplied by the second development roller 411 again to the photosensitive drum 1. The liquid developer D supplied by the development rollers 410, 411 are attached as a liquid developer film to the circumferential surface of the photosensitive drum 1, and moved therewith toward an image transfer position. Before the visible image is transferred from the photosensitive drum 1, the thickness of the liquid developer film is controlled by the squeeze roller 412.

The squeeze roller 412 is space a distance from the circumferential surface of the photosensitive drum 1. The squeeze roller 412 rotates in the direction opposite to that of rotation of the photosensitive drum 1 at a position where they confront each other. Operation of the squeeze roller 412 will be described with reference to FIG. 4. The liquid developer D supplied by the development rollers forms a liquid developer film on the drum surface, the liquid developer film having a thickness of about several hundred microns and moving at a speed U1. The film thickness of the liquid developer D is greater than the distance T between the photosensitive drum 1 and the squeeze roller 412. On the squeeze roller 412, there is a liquid developer flow D2 moving at a speed W. Therefore, there is a combined liquid developer flow having a speed $U1+W=U2$ between the photosensitive drum 1 and the squeeze roller 412, the combined liquid developer flow serving to divide the liquid developer D into two flows D1, D2. If the speed V2 of rotation of the squeeze roller 412 is increased, then the speed W is also increased to increase the thickness t2 of the flow D2, while reducing the thickness t1 of the flow D1 on the drum surface. When the relative speed between the photosensitive drum 1 and the squeeze roller 412 is higher than a certain level, the thickness t1 of the flow D1 remains constant. This thickness t1 greatly influences the manner in which the visible image is transferred to an image transfer sheet and the rate at which the discharged copy is dried.

For the squeeze roller 412 to be able to remove any excess liquid developer from the photosensitive drum 1, therefore, there must be a quantity of liquid developer which is large enough to fill the distance T between the photosensitive drum 1 and the squeeze roller 412.

The development rollers 410, 411 rotate in the same direction as that of rotation of the photosensitive drum 1 at positions where they confront each other for supplying the liquid developer to the circumferential surface of the photosensitive drum 1. Since the liquid developer is carried on the surfaces of the development rollers 410, 411, these rollers are required to rotate at a relatively high speed. The second development roller 411 as it rotates at a high speed tends to remove the liquid developer off the photosensitive drum 1 as indicated by Da in FIG. 3. Therefore, the liquid developer film as it reaches the squeeze roller 412 may sometimes have a thickness smaller than the distance T (FIG. 4). This thinner liquid developer film would not be subject to the action of the squeeze roller 412, and might have a thickness greater than the proper film thickness t1, thus appearing as circumferential stripes. If these stripes were transferred to an image transfer sheet, then they would appear as a striped pattern which would impair the quality of the copy as abnormal images or image density irregularities.

In order to eliminate the above difficulty, the development device should be provided with means (1) for guiding the liquid developer as removed by the development roller from the photosensitive drum into a position between the photosensitive drum and the squeeze roller, or a means (2) for lowering the speed of rotation of the development roller to a level which is low enough not to remove the liquid developer excessively from the photosensitive drum. These means will hereinafter be described.

3. Means (1): (FIGS. 5 and 6)

Figure 5:
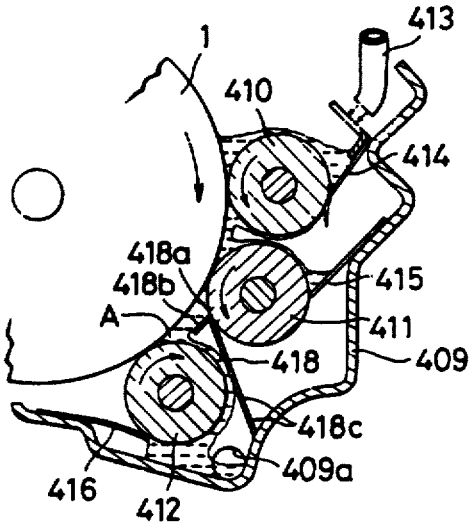
FIGS. 5 and 6 are fragmentary cross-sectional views of modifications of the development device shown in FIG. 3.
Figure 6:
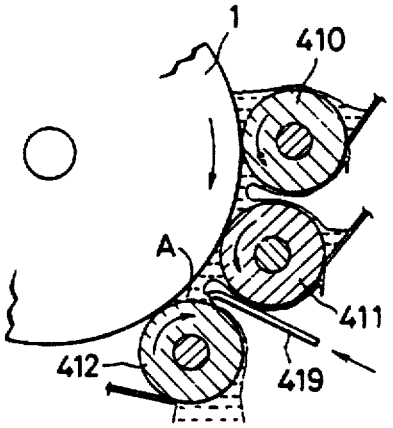

In FIG. 5, a scraper 413 serving as a means for supplying the liquid developer has an angularly bent portion 418b along an edge 418a held against the circumferential surface of the second development roller 411. The scraper 413 has a length which is substantially equal to the effective length of the second development roller 411. The scraper 412 has an end fixed to the development housing 409. The angularly bent portion 418b serves as a guide extending substantially parallel to the circumferential surface of the photosensitive drum 1 and projecting toward the squeeze roller 412. The scraper 413 also has a plurality of discharge holes 418c defined closely to the fixed end thereof for preventing the liquid developer to be pooled between the scraper 413 and the wall of the development housing 409.

When the second development roller 412 rotates at a high speed to remove the liquid developer from the photosensitive drum 1, the removed liquid developer is scraped by the edge 418a of the scraper 418 and guided by the guide 418b to flow down into the gap A between the photosensitive drum 1 and the squeeze roller 412. Although the photosensitive drum 1 and the rollers are shown as being held in contact with each other in FIG. 5, they are actually spaced a small gap by a spacing means (not shown).

The liquid developer scraped off by the scraper 415 falls into the cross-sectionally V-shaped channel between the scraper 418 and the wall of the development housing 409. The liquid developer is then allowed to flow through the discharge holes 418c onto the bottom of the housing 409. The liquid developer can be retrieved from the housing 409 through a retrieval port 409a connected to the developer tanks and the pumps.

FIG. 6 shows another modification in which a plurality of nozzles 419 (only one shown) serving as a liquid developer supplying means are disposed between the second development roller 411 and the squeeze roller 412. The nozzles 419 are spaced in the axial direction of the squeezr roller 412 for supplying the liquid developer into the gap A through a pump (not shown). The shape and direction of the nozzles 419 should be selected so as not to disturb the visible image on the photosensitive drum 1 with the liquid developer discharged from the nozzles 419. Since the gap A is supplied with the liquid developer as a film having a thickness greater than the distance T (FIG. 4), therefore, the squeeze roller 412 can effectively remove any excessive liquid developer from the photosensitive drum 1.

While in the aforesaid illustrated embodiment the two development rollers 410, 411 are positioned alongside of the photosensitive drum 1, only one development roller may be employed. Instead of the scraper 418 or the nozzle 419 for compensating for the liquid developer which is removed from the drum 1 by the second development roller 411, another liquid developer supplying means for preventing the liquid developer from being removed from the drum 1 by the second development roller 411 may be used.

4. Means (2): (FIG. 5)

According to this means (2), the scraper 418 is dispensed with, and the speed V3 of rotation of the second development roller 411 is selected to meet the relationship $V1 \geqq V3$ (V1 is the speed of rotation of the photosensitive drum 1). Where there are a plurality of development rollers employed, they are driven by a common drive source. In such an arrangement, however, the second development roller 411 or the development roller positioned immediately upstream of the squeeze roller can be controlled in its speed of rotation by suitably selecting a sprocket or gear coupled to the development roller.

In an experiment conducted under the condition: $V1 \geqq V3$, no liquid developer was removed from the photosensitive drum 1 by the second development roller 411, and no shortage of the liquid developer was caused in the gap A between the photosensitive drum 1. The experimental results obtained by varying the speeds of rotation of the photosensitive drum 1 and the second development roller 411 are given below. The liquid developer had a viscosity in the range of from 1.20 to 1.90 cps and a temperature of 25°±2° C.

| Example | Drum speed V1 (mm/sec) | Roller speed V3 (mm/sec) | Copy quality |
|---|---|---|---|
| 1 | 100 | 100 | good |
| 2 | 200 | 200 | good |
| 3 | 300 | 300 | good |
| 4 | 300 | 350 | poor |
| 5 | 300 | 320 | poor |
| 6 | 300 | 50 | good |
| 7 | 300 | 0 | good |

The above experimental Examples 4, 5 indicate that when $V1 < V3$, the copy quality was poor, i.e., a tripied pattern was produced on the copy. In the experimental Example 7, the development roller was held at rest, and no copy trouble was caused. However, it would not be practical to stop the development roller since more toner was attached to the development roller under a potential induced from the drum and the developing bias than the toner could be removed by the scraper 415. The experimental Example 6 would also be impractical though no bad copy was produced, since a complex mechanical drive would be required to achieve the speed ratio of 6:1. Therefore, the speed ratio in the range of from 1:1 to 4:1 appears to be practical, and should be selected in view of the viscosity of the liquid developer and the surface configuration of the development roller.

Where only one development roller is employed in the above means (2), the liquid developer supplied from the nozzle 413 is directed to flow between the photosensitive drum 1 and the development roller so as not to disturb or impair the visible image formed on the drum 1. With this arrangement, the speed of rotation of the development roller may be low since the development roller is not required to scoop up the liquid developer.

In the foregoing illustrated embodiments, the rotatable development bodies for visualizing the latent image comprise first and second development rollers 410, 411. However, each of the rotatable development bodies may be in the form of a belt-shaped rotatable body. Each of the first development roller 410, the second development roller 411, and the squeeze roller 412 is made of metal, but may comprise a resilient roller (as disclosed in Japanese Patent Publication No. 58-31578) made of a porous resilient material and combined with a refreshing roller for squeezing the resilient roller. The developing device in which the metal or resilient rollers are used, or a developing device employing an endless-belt developing unit, is advantageous for carrying out the present invention.

The nozzle 413 is connected to the pump of each developer tank and the pump 32b of the cleaning solution tank 42 for selectively supplying the developer or the cleaning solution to the development housing 409. Alternatively, as many nozzles 413 as the number of the tanks may be employed. As illustrated in FIG. 7, a switching valve 44 is connected to the retrieval port 409a for returning the collected liquid solution or the cleaning solution to the respective tank. The switching valve 44 is controlled by a switching means (not shown) for switching among flow passages connected to the tanks, dependent on the selected copy mode.

As shown in FIG. 7, the valve 44 is connected to the black liquid developer tank 29 by a black liquid developer retrieval pipe 405, to the magenta liquid developer tank 30 by a magenta liquid developer retrieval pipe 46, to the cyan liquid developer tank 31 by a cyan liquid developer retrieval pipe 47, to the yellow liquid developer tank 45 by a yellow liquid developer retrieval pipe 48, and to the cleaning solution tank 32 by a cleaning solution retrieval pipe 49. The nozzle 413 (which is shown as pipes in FIG. 7) in the development housing 409 is connected to a black liquid developer supply pipe 50 coupled to the pump 29a of the black liquid developer tank 29, to a magenta liquid developer supply pipe 51 coupled to the pump 30a of the magenta liquid developer tank 30, to a cyan liquid developer supply pipe 52 coupled to the pump 31a of the magenta liquid developer tank 31, to a yellow liquid developer supply pipe 53 coupled to the pump 45a of the magenta liquid developer tank 45, to a cleaning solution supply pipe 54 coupled to the pump 32b of the cleaning solution tank 32.

5. Cleaning device: (FIG. 8)

Figure 8:
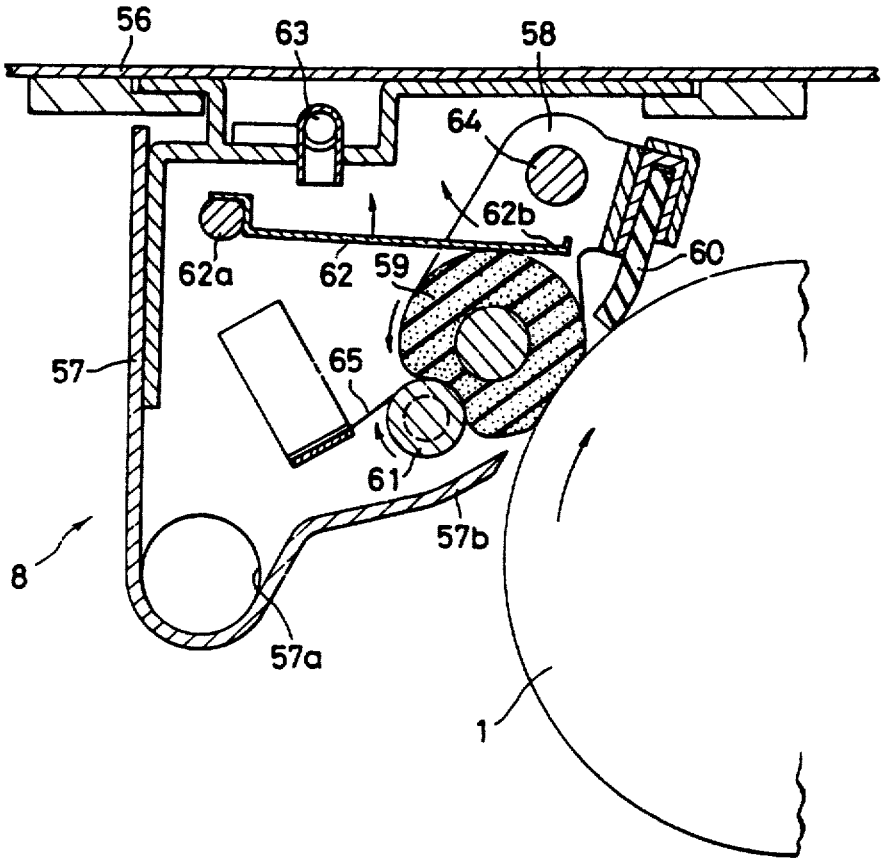
FIG. 8 is a cross-sectional view of a cleaning device.

As shown in FIG. 8, the cleaning device 8 comprises a casing 57 removably attached to an apparatus frame 56, a cleaning roller 59 and a cleaning blade 60 which are mounted by a bracket 58 on the frame 56, a squeeze roller 61, a cleaning solution dispersing plate 62, and a cleaning solution supply nozzle 63. The bracket 58 is swingably supported on a shaft 64 fixed to the frame 56. When a cleaning process is completed, the bracket 58 is angularly moved clockwise about the shaft 64 by a means (not shown). The cleaning roller 59 is made of a liquid-absorbing resilient material such as sponge rubber, and is rotatable counterclockwise in the direction of the arrow by a drive mechanism (not shown). The cleaning blade 60 is made of a rubber or a similar elastometric material. During the cleaning process, the cleaning blade 60 has its free end pressed against the surface of the photosensitive drum 1, and the cleaning roller 59 has its circumferential surface pressed against and elastically deformed by the photosensitive drum 1. In the cleaning mode in which the blade 60 and the roller 59 are pressed against the drum surface, the roller 59 is also elastically deformed to a large extent by the squeeze roller 61. The squeeze roller 61 is driven by a non-illustrated drive mechanism to rotate clockwise in the direction of the arrow for squeezing the cleaning solution out of the cleaning roller 59. A scraper 65 is pressed against the squeeze roller 61 for scrapping the cleaning solution off the circumferential surface of the squeeze roller 61. The cleaning solution supply nozzle 63 is connected through a port 204 (FIG. 7) to the cleaning solution supply pipe 55. The dispersing plate 62 is disposed below the nozzle 63 for dispensing the cleaning solution supplied from the nozzle 63 in the longitudinal direction of the cleaning roller 59. The dispersing plate 62 is angularly movable on a shaft 62a connected to an edge thereof and has its free marginal edge 62b held by gravity against the circumferential surface of the cleaning roller 59. The free marginal edge 62a has a small upturned lip for forming a pool of the cleaning solution. In the cleaning mode, the free marginal edge 62b of the dispersing plate 62 is lower than the edge thereof connected to the shaft 62a. The casing 57 has a retrieval port 57a for retrieving the cleaning solution supplied to the casing 57. To the retrieval port 57a, there is connected an end of the cleaning solution retrieval pipe 66 (FIG. 7) with its opposite end positioned above the cleaning solution tank 32. When not in the cleaning mode, the cleaning roller 59 and the cleaning blade 60 are angularly moved about the shaft 64, as described above. At this time, the cleaning roller 59 is spaced from the photosensitive drum 1 and the squeeze roller 61 and hence is free from elastic deformation. Simultaneously, the dispersing plate 62 is angularly moved to life the free marginal edge 62b higher than the end coupled to the shaft 62a. When the photosensitive drum 1 is not cleaned, the cleaning solution attached to the cleaning roller 59 and the dispersing plate 62 drops onto the bottom 67b of the casing 57 without falling on the circumferential surface of the photosensitive drum 1.

6. Image transfer sheet feed paths: (FIG. 2)

There are three sheet feed paths available for image transfer sheets discharged by the paired discharge rollers 23. One of the sheet feed paths is used when producing a one-sided copy with a developer in one color. In this sheet feed path, the image transfer sheet is discharged into the tray 24 as indicated by the reference character a in FIG. 2. Another sheet feed path is followed when images are copied on the both sides of an image transfer sheet. In this sheet feed path, the image transfer sheet discharged as indicated at a is delivered in a switchback manner again toward the photosensitive drum 1. An image transfer sheet follows the third sheet feed path for generating a full colored or multicolor copy with a plurality of developers. The image transfer sheet discharged by the discharge rollers 23 is returned toward the photosensitive drum 1 as indicated by the reference character c. Upon completion of the double-sided copy mode, the fully-colored copy mode, or the multicolor copy mode, the image transfer sheet is discharged into the tray 24 as indicated by a.

7. Recirculation system 1: (FIGS. 1 through 8)

Operation of the image forming apparatus thus constructed for forming a colored image will be described below for each copy mode.

The copy modes can be selected by operating on a control section (not shown). When the main switch of the apparatus is turned on, the photosensitive drum 1 is rotated clockwise, and the cleaning solution is supplied by the pump 32a from the cleaning solution tank 32 to the cleaning device 8. The bracket 58 is swung couterclockwise by the non-illustrated drive mechanism to press the cleaning roller 59 and the cleaning blade 60 against the circumferential surface of the photosensitive drum 1, and at the same time, the cleaning roller 59 and the squeeze roller 61 are driven to rotate about their own axes (FIG. 8). The cleaning solution flows from the nozzle 63 down onto the dispersing plate 62, by which the cleaning solution is dispersed and supplied between the cleaning roller 59 and the photosensitive drum 1. The cleaning solution is then absorbed by the cleaning roller 59 which rotates counterclockwise and from which the cleaning solution has been squeezed by the squeeze roller 61, and is carried by the cleaning roller 59 toward the squeeze roller 61. The cleaning solution is then squeezed out of the cleaning roller 59 by the squeeze roller 61, and scraped off the squeeze roller 61 by the scraper 65 to flow onto the casing bottom 57b. The cleaning solution is then retrieved through the retrievalport 57a and the retrieval pipe 66 into the cleaning solution tank 32. The cleaning solution on the surface of the photosensitive drum 1 is scraped off by the cleaning blade 60.

[[]]Monochromatic color copy mode[[]]

In this copy mode, the image of an original document placed on the original document table 9 is developed by a developer of one color such as black, magenta, cyan, or yellow. Normally, the image forming apparatus is arranged to operate in a black copy mode when the main switch thereof is turned on. Therefore, it is not necessary to make any color designation when a black copy is to be made. For making a copy of another color, however, such a color must be designated.

Figure 3:
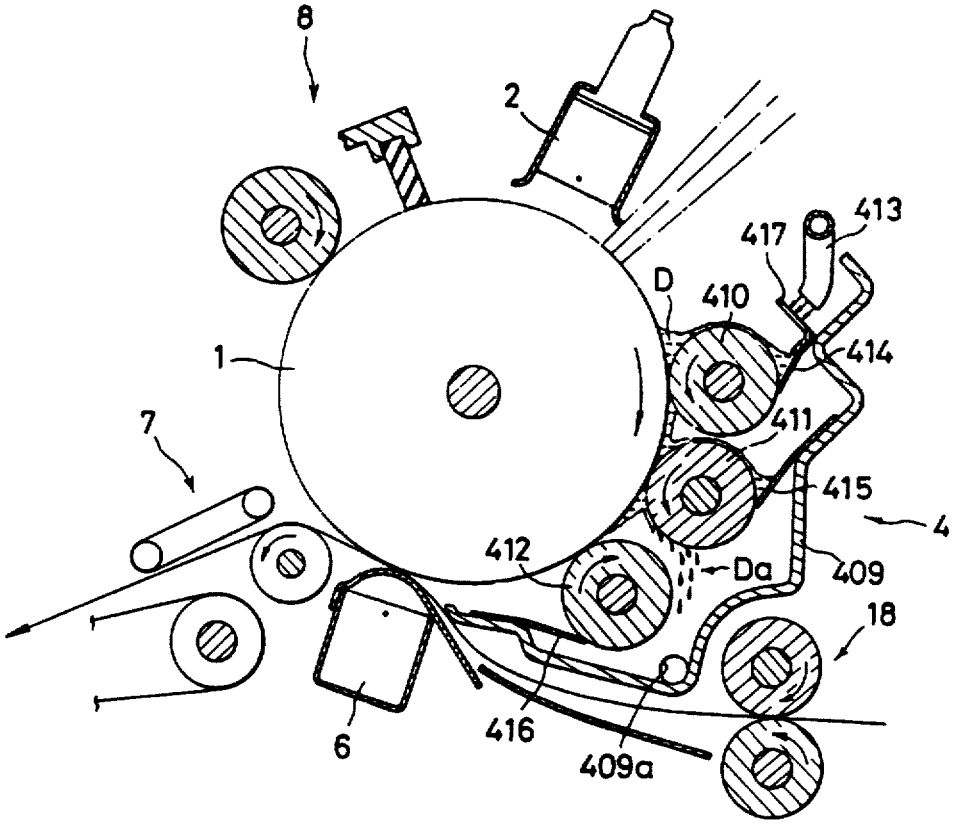
FIG. 3 is a cross-sectional view of a development device composed of rotatable rollers.

If a copy in red is to be produced, the color red is designated, and the development housing 409 then starts being cleaned. More specifically, the switching valve 44 connected to the retrieval port 409a of the housing 409 is switched to connect the retrieval port 409a to the cleaning solution retrieval pipe 49, and the pump 32b is actuated to supply the cleaning solution from the cleaning solution tank 32 through the cleaning solution supply pipe 54 and the nozzle 413 into the development housing 409. At this time, the first and second development rollers 410, 411 and the photosensitive drum 1 are rotated in the directions of the arrows. The cleaning device 8 is now in the cleaning mode as shown in FIG. 8. By supplying the cleaning solution to the development housing 409, any liquid developer which may have remained in the previous development cycle is cleaned away to prevent such previous liquid developer from being mixed in the magenta liquid developer. The development housing 409 is continuously cleaned for a prescribed interval of time. When the cleaning operation is over, the switching valve 44 is operated by a control means (not shown) to connect the development housing 409 to the magenta liquid developer retrieval pipe 46, and the pump 30a is actuated to supply the magenta liquid developer from the magenta liquid developer tank 30 via the supply pipe 51 to the development housing 409, as shown in FIG. 7. During this time, the pumps of the tanks storing the other liquid developers and the pump 32b of the cleaning solution tank 32 are not operated. The first development roller 410, the second development roller 411, and the squeeze roller 412 in the development housing 409 are now rotated in the directions of the arrows (FIG. 3). The liquid developer supplied from the nozzle 413 is delivered to the surface of the photosensitive drum 1 in the manner described above, and then retrieved through the retrieval port 409a and the retrieval pipe 46 into the magenta liquid developer tank 30. Therefore, when a copy in red is selected, the magenta liquid developer is recirculated through the tank 30, the development housing 409, and the switching valve 44.

When the magenta liquid developer starts being recirculated after the photosensitive drum 1 has made a prescribed number of revolutions to complete its cleaning, a signal indicative of the readiness to begin a copying cycle is issued. By depressing a print button (not shown), the photosensitive drum 1 starts to be rotated clockwise and is charged by the charger 2 to a prescribed polarity as shown in FIG. 1. The original document to be copied is scanned by the optical system 2, and the circumferential surface of the photosensitive drum 1 is exposed to the image of the original document projected by the optical system 2 for thereby forming an electrostatic latent image on the drum 1. Then, as shown in FIGS. 3 through 6, the electrostatic latent image on the drum 1 is visualized in red by the magenta liquid developer supplied by the first development roller 410. The visible image on the drum 1 is perfected by the magenta liquid developer additionally supplied by the second development roller 411. The development rollers 410, 411 are connected to a power supply (not shown) which applies a biasing voltage to these rollers 410, 411. Therefore, the development rollers 410, 411 double as biasing electrodes. The development rollers 410, 411 thus serve to supply the magenta liquid developer to the drum 1 and also to attract the magenta toner from a non-image area on the drum 1 toward the rollers 410, 411 themselves for eliminating smearing of the image background. The liquid developer containing the toner attached to the roller 410, 411 is scraped by the scrapers 414, 415 and collected through the retrieval port 409a back to the magenta liquid developer 30.

There is a liquid developer film of a relatively large thickness on the surface of the photosensitive drum 1 on which the visible image has been formed by the development rollers 410, 411. This liquid developer film is scraped by the squeeze roller 412 to a prescribed thickness.

In response to the depression of the print button, an image transfer sheet is delivered from the selected sheet cassette in the sheet feeder 5 and gripped by the register rollers 19. This image transfer sheet is then fed into registry with the image area on the photosensitive drum 1 and kept in intimate contact therewith.

The path of travel of the image transfer sheets will be described with reference to FIG. 2. The visible image is transferred to the image transfer sheet attached to the photosensitive drum 1 by the charger 6 disposed behind the image transfer sheet. The image transfer sheet to which the visible image has been transferred is separated from the surface of the drum 1 by the sheet separator 7, and is then discharged through the fixing device 22 and the discharge rollers 23 into the tray 24.

As shown in FIG. 8, remanent toner which has not been transferred to the image transfer sheet is attached to the circumferential surface of the photosensitive drum 1 from which the visible image has been transferred. The remanent toner is positionally disturbed by the cleaning roller 59 which rotates in one direction and has its liquid absorbing capability increased by the squeeze roller 61, and is then scraped off the drum surface by the cleaning blade 60. The liquid developer containing the scraped toner together with the cleaning solution supplied from the nozzle 63 is absorbed by the cleaning roller 59 and hence lifted off the drum surface. The cleaning solution containing the toner, which is absorbed by the cleaning roller 59, is squeezed out of the cleaning roller 59 by the squeeze roller 61, and flows into the casing 57, from which the cleaning solution is retrieved through the retrieval port 57a back into the cleaning solution tank 32. Therefore, the proportion of the toner in the cleaning solution in the cleaning solution tank 32 becomes progressive higher.

During the cleaning process, the toner is removed from the cleaning solution. As illustrated in FIG. 1, the electrode roller 33 is rotated counterclockwise to electrically attract the toner contained in the cleaning solution. The toner attracted to the roller surface is scraped by the scraper 34 and collected in the container 36. Thus, the toner concentration in the cleaning solution is kept below a prescribed leve at all times for thereby achieving a good cleaning capability.

Inasmuch as the cleaning device 8 removes the residual liquid developer from the surface of the photosensitive drum 1, the liquid level in the cleaning solution tank 32 is gradually raised. Such an increased in the liquid level may be detected by a known liquid level detector or may be prevented by a known overflow prevention means.

For producing a copy in a different color, the control section (not shown) is operated on to select the desired color and enable the apparatus to produce such a desired copy in the same process as described above.

[[]]Fully colored copy mode[[]]

In this copy mode, a colored copy is reproduced from an original document which is fully colored, and the black liquid developer is not used for development. This copy mode can be selected by operating on the non-illustrated control section.

In the fully colored copy mode, the photosensitive drum 1 is exposed to the image of the original document through a color separation filter device 15, and an electrostatic latent image and its corresponding visible image are formed repeatedly for respective colors. The visible images developed by the respective liquid developers are superposed on an image transfer sheet.

The color separation filter device 15 has a red filter RE capable of transmitting red and white light, a green filter GR capable of transmitting green and white light, and a blue filter BL capable of transmitting blue and white light. The color separation filter device 15 can be rotated around its shaft for selectively positioning the filters on the optical path between the photosensitive drum 1 and the optical system 3.

For copying a fully colored original document, the photosensitive drum 1 is first exposed to the image through the red filter RE, and the electrostatic latent image on the drum 1 is developed by the cyan liquid developer into a cyan image which is then transferred to an image transfer sheet. In an ext cycle, the green filter GR is selected to form an electrostatic latent image which then developed by the magenta liquid developer into a magenta image that is transferred to the same image transfer sheet in registration with the cyan image. In the third cycle, the electrostatic latent image formed by the blue filter BL is developed by the yellow liquid developer into a yellow image which is transferred to the same image transfer sheet, thereby obtaining a fully colored image. Each time the visible image is transferred to the image transfer sheet, it is fixed to the sheet. Thus, the image transfer sheet is recirculated in the direction of the arrow c (FIG. 2) from the discharge rollers 23. After the final color image has been fixed, the image transfer sheet is discharged into the tray 24 as indicated at a.

In the fully colored copy mode, the development housing 409 is supplied with the differently colored liquid developers in the controlled sequence. Each time the image has been developed with one liquid developer, the development housing 409 is supplied with the cleaning solution from the cleaning solution tank 32 to clean the housing 409 and the rollers therein. During this cleaning process, the image transfer sheet is fed through the feed rollers 25, 26, 27 and then held at rest with its leading edge held against the register rollers 19. In the fully colored copy mode, the switching valve 44 is sequentially actuated to effect switching among the retrieval pipes connected to the development tank 409 under the sequential control.

[[]]Double-sided copy mode[[]]

The double-sided copy mode produces copied images on both sides of an image transfer sheet. When selecting this mode, one color is designated. Different colors may be selected respective images on both sheet sides.

For copying one page of the original document on one surface of the sheet, the copying process is the same as the aforesaid monochromatic color copy mode until the image transfer sheet with the image copied on one surface thereof is discharged by the discharge rollers 23 in the direction of the arrow a. Then, the discharged image transfer sheet switches back in the direction of the arrow b toward the photosensitive drum 1. The image transfer sheet is fed by the feed rollers 25, 26, 27 and held by the register rollers 19, during which time another page to be copied of the original document is placed on the table 9. Then, the print button is depressed to transfer a visible image of the other page to the opposite surface of the image transfer sheet. The image transfer sheet with the copied images on both surfaces thereof is then discharged by the discharge rollers 23 into the tray 24 in the direction of the arrow a.

If it is desired to copy images in different colors on the opposite surfaces of the image transfer sheet, then the respective colors are designated when this mode is selected. The liquid developers of the designated colors are successively supplied from the respective liquid developer tanks in response to the depression of the print button. After one liquid developer has been employed and before the other liquid developer is used, the development housing 409 and the cleaning device 8 are cleaned.

Except for the cleaning process to be effected between different liquid developer colors, the development housing and the cleaning device may be cleaned immediately after the copy mode is completed, rather than before the copy mode is started. More specifically, a suitable timer mechanism may be employed to set the photosensitive drum, the development rollers, and the cleaning roller in the cleaning mode for a preset period of time after the main switch has been turned off. At the same time, the pump for supplying the cleaning solution is operated to supply the cleaning solution to clean the drum and the rollers. Consequently, it is not necessary to clean the drum and the rollers at the start of a next copying cycle. In this cleaning process, any toner can more effectively be removed by the cleaning solution since the toner used in the copying cycle still remains wet.

8. Recirculation system 2: (FIGS. 9 through 13)

In the above embodiments, the cleaning device 8, the development housing 409, and the rollers accommodated therein are cleaned by the cleaning solution supplied from the cleaning solution tank 32. However, the cleaning device 8, the development housing 409, and the rollers accommodated therein may be cleaned by the black liquid developer.

Figure 9:
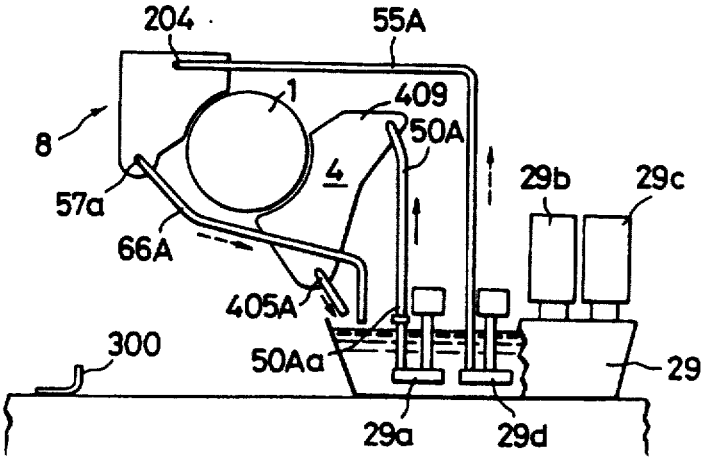
FIGS. 9 and 10 are side elevational views, partly cut away, of apparatus according to other embodiments.

As shown in FIG. 9, a pump 29d is disposed in the black liquid developer tank 29 and connected by a supply pipe 55A to the nozzle 63 (FIG. 8) of the cleaning device 8. A retrieval pipe 66A has one end connected to the retrieval port 57a of the casing 57 and the opposite end disposed over the black liquid developer tank 29. During a copying process and copying processes effected before and after the copying process, the black liquid developer is supplied to the cleaning device 8 and the development housing 409 to clean them. The black liquid developer supplied to the development housing 409 is retrieved therefrom through a liquid developer retrieval pipe 405A during black copying and cleaning cycles.

Where the black liquid developer is used as a cleaning solution as described above, the liquid developers in other colors may be mixed in the black liquid developer. However, the sharpness of a black copy will not be substantially impaired by other color toners which may be mixed more or less in the black liquid developer. The toner of the black liquid developer used as the cleaning solution may also be mixed in the other color liquid developers, but will not adversely affect copied images to a substantial extent. For example, even if the black toner is mixed in the magenta liquid developer tank 30, the magenta liquid developer is supplied to the development housing 409 for producing red copies, and tends to be positively consumed for image visualization. Therefore, the magenta liquid developer will not remain in the magenta liquid developer tank 30. This holds true for the other liquid developer tanks. Accordingly, the formation of images will not substantially be adversely affected by the black liquid developer used as the cleaning solution. In case the black liquid developer is employed as the cleaning solution, it is unnecessary to provide a dedicated cleaning solution tank such as the tank 32 in FIG. 7. As a consequence, the space which would be required by the dedicated cleaning solution tank can be saved, with the result that the image forming apparatus can be designed with more flexibility.

Figure 10:
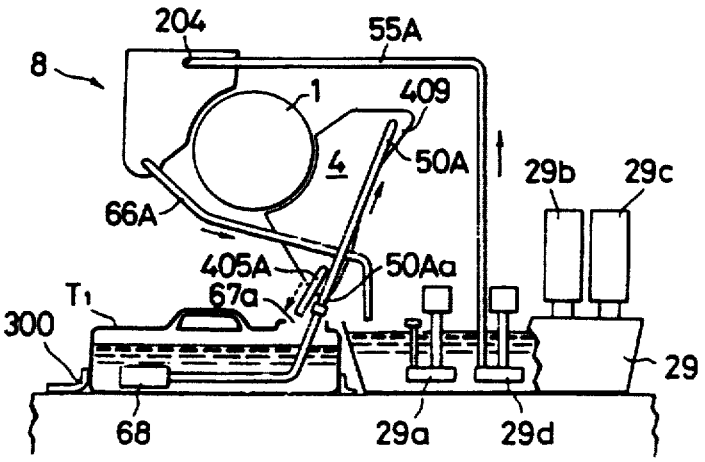

According to the embodiments of FIGS. 1 and 9, the apparatus has as many liquid developer tanks as required for producing fully colored copies, and hence is large in size. To reduce the size of the apparatus, only the black liquid developer tank may be employed, and any other liquid developer tanks may be dispensed with. The cleaning solution tank 32 may be left, or may be replaced with the black liquid developer tank 29. FIGS. 9 and 10 illustrate an arrangement in which the black liquid developer tank 29 doubles as a cleaning solution tank. A supply pipe 50A for supplying the black liquid developer to the development housing 409 has an end 50Aa detachably coupled to the pump 29a. The liquid developer retrieval pipe 405A is swingably movable between the position of FIG. 9 and the position of FIG. 10. For producing copies of black images, the liquid developer retrieval pipe 405A is positioned as shown in FIG. 9.

A liquid developer of another color is stored in a portable disposable tank T1 having a pump 68 for delivering the liquid developer. The pump 68 can be connected to the end 50Aa of the liquid developer supply pipe 50A that is disconnected from the pump 29a of the black liquid developer tank 29.

The color of the liquid developer contained in the disposable tank T1 may be magenta, cyan, yellow, or another black color which is different in darkness from the black color of the black liquid developer contained in the tank 29.

A certain number of such disposable tanks may be placed in a storage space such as shelf. This arrangement is advantageous in that the storage space may be designed freely, and the image forming apparatus may small in size since it is not required to carry a number of liquid developer tanks storing different color liquid developers.

The disposable tank T1 is small in size and lightweight and has a handle so that it can easily be carried around. The image forming apparatus has a guide 300 for positioning the disposable T1 as shown in FIG. 10. The disposable tank T1 contains a premixed liquid developer composed of a toner carrier and a toner which are mixed at a desired mixture ratio, the tone being of any one of the colors as described above. The disposable tank T1 is smaller and lighter than the liquid developer tank 29 because the disposable tank T1 has no toner bottle and no toner carrier bottle.

When a copy is to be produced in red, the disposable tank T1 in which the magenta liquid developer is contained is placed next to the blank liquid developer tank 29 as illustrated in FIG. 10. The disposable tank T1 is fixedly positioned by the guide 300. After the lid is removed from an opening 67a of the tank T1, the end 50Aa of the supply pipe 50A is connected to the tank 68. Then, the liquid developer retrieval pipe 405A of the development housing 409 is angularly moved to a position over the opening 67a. The pump 68 is electrically connected to a power supply (not shown). When the main switch is closed, the pump 68 is operated to supply the magenta liquid developer to the nozzle 413 (FIG. 3) of the development housing 409. Thereafter, an original document to be copied is set, and the print button is depressed to produce a copy in red. After the copy is produced, the liquid developer supply pipe 50A is connected again to the pump 29a of the black liquid developer tank 29, and the liquid developer retrieval pipe 405A is swung back to the position of FIG. 9. The opening 67a is then closed by the lid, and the disposable tank T1 is carried away to its storage location.

With the structure of FIG. 10, the image forming apparatus for producing multicolor copies is small in size and can be manufactured inexpensively. When the color copy mode is continued, the concentration of the toner in the disposable tank T1 is gradually lowered. Therefore, suitable provision should be made for checking the toner concentration and issuing an alarm when the toner concentration is lowered below a certain limit.

As an alternative arrangement, the opening 67a of the disposable tank T1 may be shaped so as to be positioned below the retrieval pipe 405A which is fixedly positioned as shown in FIG. 9. The retrieval pipe 405A may be provided with a vertically movable auxiliary pipe for allowing the block liquid developer to flow therethrough down into the black liquid developer tank 29 without splashing. When the disposable tank T1 is to be used, the auxiliary pipe is retracted upwardly, and when the disposable tank T1 is not in use, the auxiliary pipe is lowered. A dedicated cleaning solution tank for supplying a cleaning solution to clean the interior of the development housing 409 may be attached to the arrangement of FIG. 9.

The disposable tank T1 of FIG. 10 may be divided into two liquid chambers, one storing a liquid developer for visualizing an electrostatic latent image on the photosensitive drum 1 and the other storing a cleaning solution comprising a liquid developer in the same color and concentration as those of the liquid developer stored in said one liquid chamber. The liquid developer and the cleaning solution can be supplied by respective pumps to the development housing and the cleaning casing according to a copying process, and then returned to their respective liquid chambers in the disposable tank T1. When the image forming apparatus is in an idling mode in which no image is developed, the development housing and the cleaning casing are supplied with and cleaned by the liquid developer serving as the cleaning solution. When in the development mode, the development housing and the cleaning casing are supplied with the liquid developer for visualizing the latent image and cleaning the photosensitive drum. If the toner carried of the liquid developer were used as the cleaning solution, it would be likely for the liquid developer to be diluted when developing an image immediately after the development housing is cleaned. This problem is completely solved by using, as the cleaning solution, a liquid developer in the same color and concentration as those of the liquid developer employed for image visualization. Each of the liquid developer tanks as shown in FIG. 1 may also be divided into two liquid chambers.

Since the black liquid developer tank 29 finds frequent use, the liquid developer contained therein is often required to be exchanged entirely. Furthermore, when the image forming apparatus is to be moved, the liquid developer is drawn out of the black liquid developer tank 29 to avoid spilling thereof which would take place during the movement of the apparatus. It has been customary practice to use a dedicated pipe for discharging the liquid developer. However, the liquid developer tank may be simpler in structure by using a cleaning solution retrieval pipe also as a pipe for drawing out the liquid developer.

Figure 11:
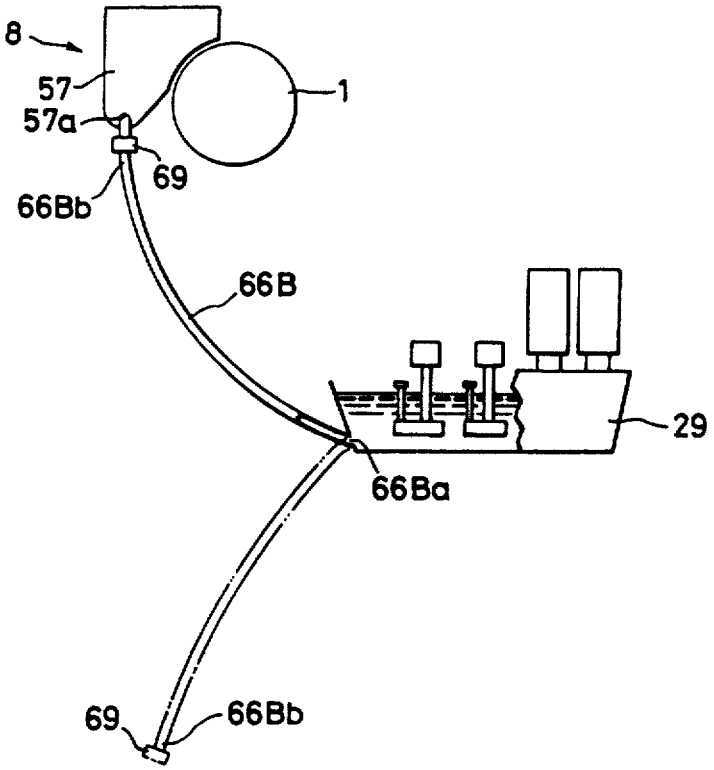
FIG. 11 is a side elevational view, partly broken away, of a developer tank according to still another embodiment.
Figure 12:
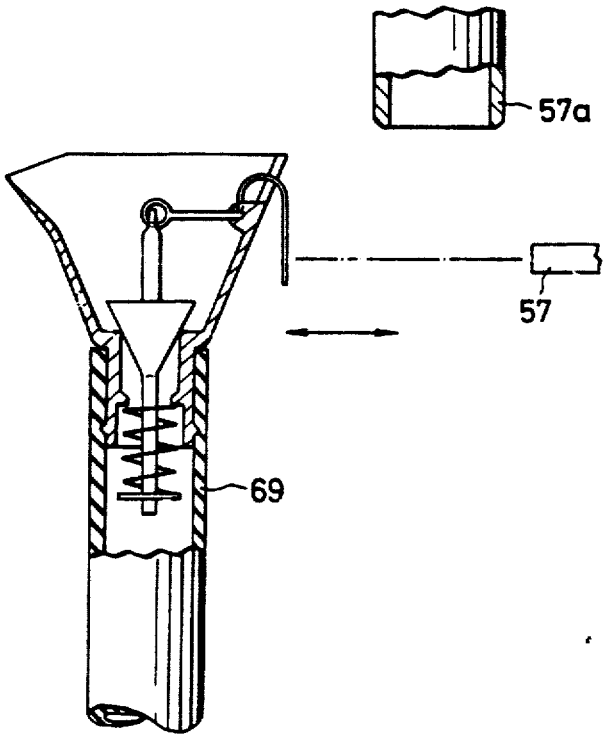
FIGS. 12 and 13 are cross-sectional views of valves incorporated in ends of cleaning solution collecting pipes.
Figure 13:
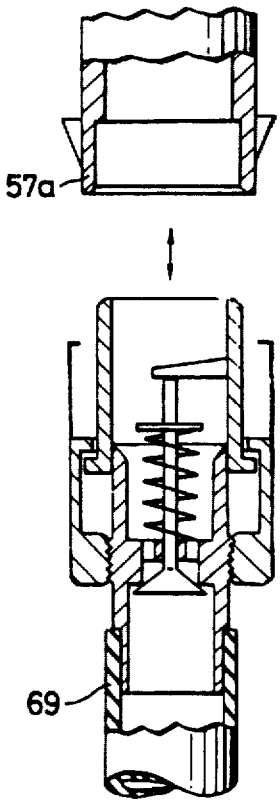

Such an arrangement will be described with reference to FIG. 11. The liquid developer tank 29 and the cleaning device 8 are interconnected by a cleaning solution retrieval pipe 66B having one end 66Ba connected to the bottom of the tank 29 and the other end 66Bb connected detachably to the cleaning solution retrieval port 57a of the cleaning casing 57. The cleaning solution retrieval pipe 66B is normally coupled to the cleaning casing 57 and the liquid developer tank 29 as indicated by the solid lines in FIG. 11. When drawing the liquid developer off the tank 29, the end 66Bb of the cleaning solution retrieval pipe 66B is detached from the casing 57, and the cleaning solution retrieval pipe 66B is positioned as indicated by the two-dot-and-dash lines in FIG. 11. The end 66Bb of the pipe 66 has a valve 69 which can automatically be opened when the end 66Bb is inserted in the retrieval port 57a of the casing 57, and can automatically be closed when the end 66Bb is disconnected from the casing 57, The valve 69 is also manually openable. Two different structural details for the valve 69 are illustrated in FIGS. 12 and 13, respectively.

Figure 14:
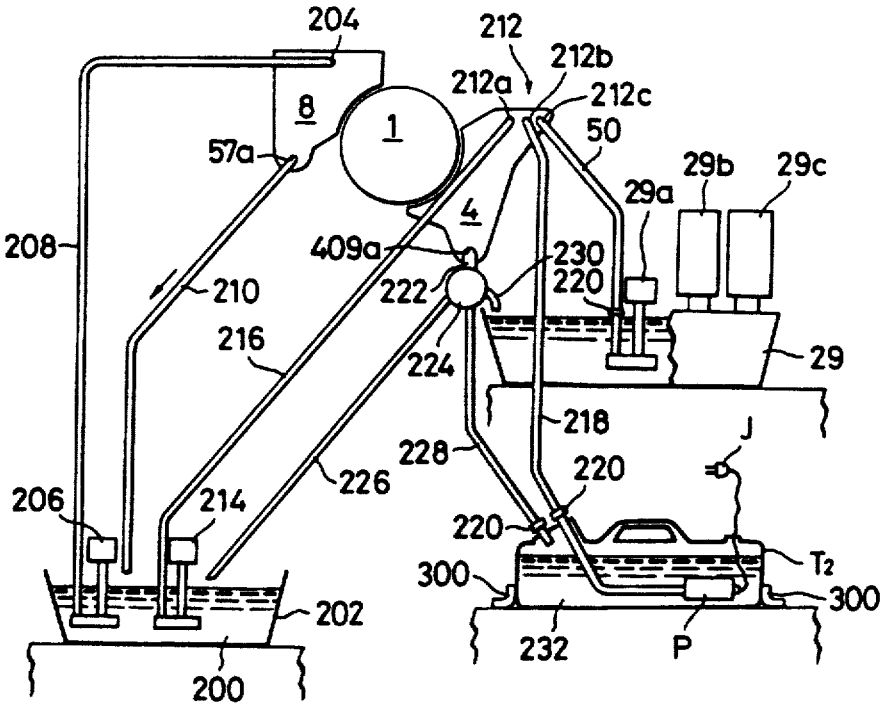
FIGS. 14 through 20 are side elevational views, partly cut away, of pipe systems by which developer containers, a cleaning device, and a cleaning solution tank.

9. Recirculation system 3: (FIG. 14)

This image forming apparatus has a disposable tank T2 and a cleaning solution tank 202 storing a cleaning solution 200.

The inlet port 204 of the cleaning device 8 is connected through a supply pipe 208 to a pump 206 disposed in the cleaning solution tank 202 for delivering the cleaning solution 200. The retrieval port 57a is to a retrieval pipe 210 having its lower end opening over the cleaning solution tank 202. The development device 4 has three inlet ports 212a, 212b, 212c. The inlet port 212a is connected via a supply pipe 216 to a pump 214 disposed in the cleaning solution tank 202 for delivering the cleaning solution 200. The inlet port 212b is connected through a supply pipe 218 to a pump P positioned in the disposable tank T2, the supply pipe 218 being detachably connected to the pump P through a connector 220. The inlet port 212c is connected by the supply pipe 50 to the pump 29a for supplying the black liquid developer from the black liquid developer tank 29. The supply pipe 50 is detachably connected to the pump 29a through a connector 220.

A single outlet or retrieval pipe 222 is connected between the liquid retrieval port 490a of the development device 4 and an electrically-operated three-way switching valve 224 comprising a directional control valve. The three-way switching valve 224 has an outlet connected to a retrieval pipe 226 with its lower open end disposed over the cleaning solution tank 202, and another outlet connected to a retrieval pipe 228 communicating with the disposable tank T2. The retrieval pipe 228 is detachably coupled to the disposable tank T2 through a connector 220. The third outlet of the three-way switching valve 224 is connected to a shorter pipe 230 opening over the liquid developer tank 29.

In the black copy mode, the valve 224 is shifted to communicate with the shorter pipe 230, and the pumps 206, 29a are driven to develop a latent image with the black liquid developer and to clean the photosensitive drum 1 with the cleaning solution 200.

For the color copy mode, the disposable tank T2 is mounted in position and connected to the supply pipe 218 and the retrieval pipe 228, and a terminal J coupled to the pump P is connected to a power supply.

Then, the color copy mode is selected on the control section to shift the valve 224 to communicate with the retrieval pipe 226 and actuate the pump 214 for cleaning the development device 4. This cleaning process is carried out to prevent any other remanent color liquid developer from flowing into the disposable tank T2.

Upon elapse of a prescribed time for cleaning the development device 4, the valve 224 is shifted into communication with the retrieval pipe 228 and the pumps P, 206 are operated. An image on the photosensitive drum 1 is now developed with the color liquid developer 232 from the disposable tank T2, and the cleaning solution 200 is supplied from the cleaning solution tank 202 to the cleaning device 8.

Since the development device 4 is cleaned by the cleaning solution 200 when the modes are changed, any different color liquid developer is prevented from being mixed with the desired liquid developer.

The development device 4 may automatically or manually be cleaned each time the developer color is changed. Inmuch as the toner is mixed in a progressively increasing quantity with the cleaning solution 200 as the cleaning cycle is repeated, the mixed toner should be retrieved or removed by an electrode roller or any other suitable means.

When the color copy mode is over, the disposable tank T2 is detached from the illustrated position and taken back to its storage position with its openings closed.

10. Recirculation system 4: (FIG. 15)

The pipe system of this embodiment is similar to that of FIG. 14 except for the pump 214, the supply pipe 216, and the retrieval pipes 226, 228 shown in FIG. 14. Identical functional components in FIG. 15 are denotes by identical reference characters in FIG. 14 and will not be described in detail.

The liquid retrieval port 409a of the development device 4 is connected to a shorter pipe 240 similar to the pipe 405A shown in FIGS. 9 and 10. The pipe 240 is angularly movable selectively between a position over an opening 67'a of a disposable tank T3 similar to the disposable tank T1 and a position over the liquid developer tank 29 containing the black liquid developer.

Figure 15:
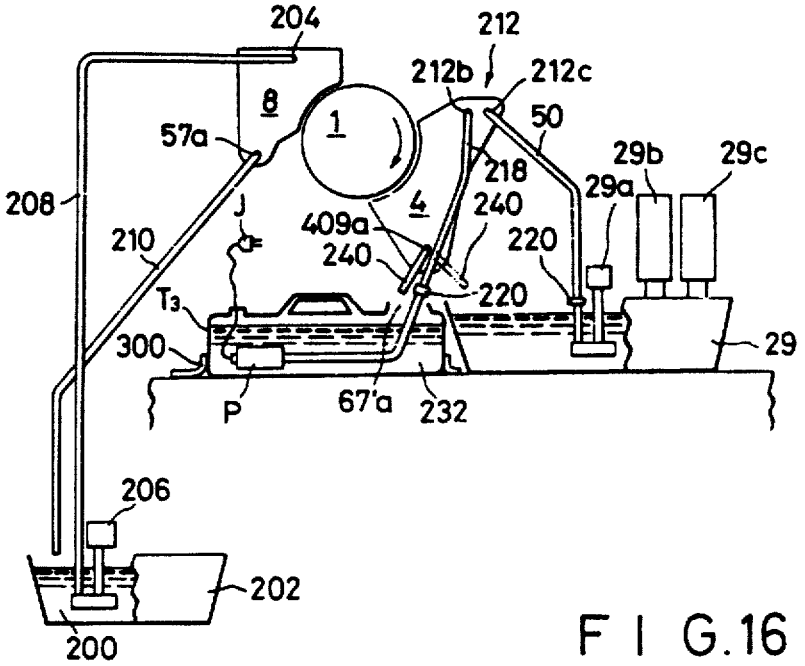

Since the pump 214 and its pipe as shown in FIG. 14 are not provided in the system of FIG. 15, the development device 4 is not cleaned by the cleaning solution 200. In either the black copy mode or the color copy mode, however, the cleaning device 8 is fed with the cleaning solution 200 for cleaning the photosensitive drum 1.

In the black copy mode, the pumps 29a, 206 are driven. The black liquid developer supplied from the liquid developer tank 29 to the development device 4 is retrieved through the shorter pipe 240 back to the liquid developer tank 29.

In the color copy mode, the pump P of the disposable tank T3 and the pump 206 are actuated. The color liquid developer 232 supplied from the disposable tank T3 to the development device 4 is retrieved through the shorter pipe 240 to the disposable tank T3.

11. Switchinq means for the retrieved liquid: (FIGS. 16 and 17)

This arrangement can be incorporated primarily in the embodiments of FIGS. 10 and 15. In these embodiments, the shorter pipe 405A or 240 for retrieving the liquid from the development device 4 is required to be angularly moved each time the copy mode is changed.

With this arrangement, the disposable tank has an overhanging member defining its opening, and this overhanging member will be positioned over the opening of the black liquid developer tank when the disposable tank is mounted in position. Switching operation required for directing the liquid from the development device 4 selectively to the black liquid developer tank or the disposable tank is therefore simplified.

Figure 16:
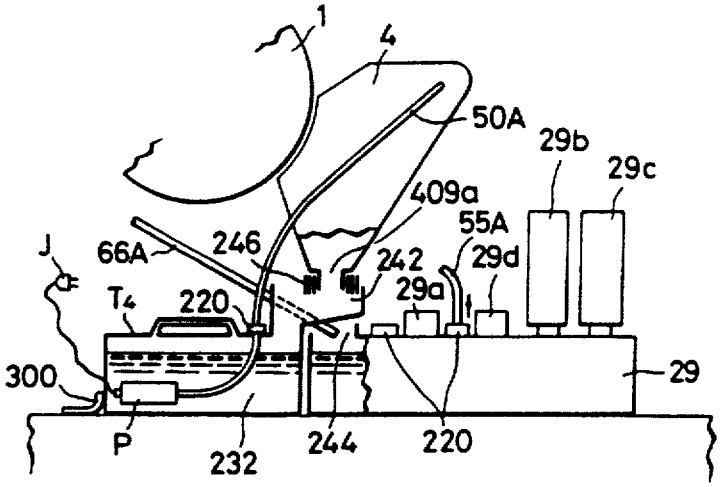
Figure 17:
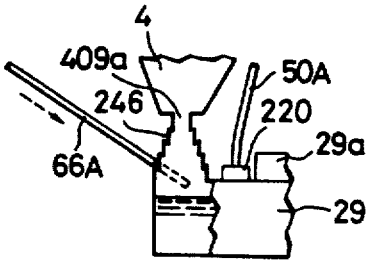

FIGS. 16 and 17 are illustrative of the arrangement as incorporated in the embodiment of FIGS. 9 and 10. Identical parts in FIGS. 16 and 17 are designated by identical reference characters in FIGS. 9 and 10.

The opening, denoted at 242, is defined by the overhanging member of the disposable tank denoted at T4. When the disposable tank T4 is mounted in position, the opening, denoted at 244, of the black liquid developer tank 29 is covered by the overhanging member.

As shown in FIG. 16, when the disposable tank T4 is positioned in place, the overhanging member defining the opening 242 is positioned in covering relation to the opening 244 of the black liquid developer tank 29, and the opening 242 is located directly below the liquid retrieval port 409a of the development device 4.

In the color copy mode, therefore, the color liquid developer 232 is supplied from the disposable tank T4 via the supply pipe 50A to the development device 4, and then retrieved through the retrieval port 409a and the opening 242 to the disposable tank T4.

In the black copy mode, the disposable tank T4 is carried away to expose the opening 244 directly to the retrieval port 409a. Thus, the black liquid developer can be retrieved from the development device 4 through the retrieval port 409a and the opening 244 to the liquid develper tank 29.

To prevent the liquid developer from being scattered around through the gap between the retrieval port 409a and the opening 244, an extensible pipe 246 is attached to the retrieval port 409a and extended downwardly as shown in FIG. 17. When the disposable tank T4 is used, the extensible pipe 246 is contracted to avoid interference with the overhanging member as shown in FIG. 16. The extensible pipe 246 may comprise a bellows pipe, a telescopic pipe, or the like.

12. Recirculation system 5: (FIG. 18)

The disposable tank is divided into two liquid chambers each having a pump. Before an image is developed with a different color liquid developer, the development device is cleaned by a coner carrier or a color liquid developer in the same color as that of the color liquid developer to be used for image development.

Figure 18:
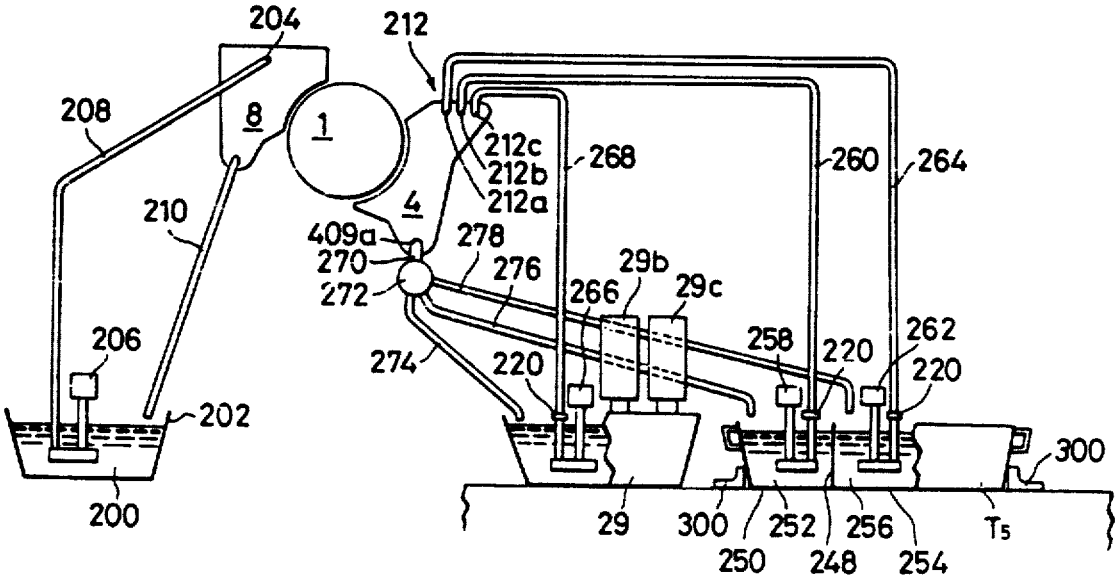

As shown in FIG. 18, a disposable tank T5 is divided by a partition 248 into two liquid chambers. The first chamber, denoted at 250, contains a solution 252 for cleaning the development device 4, and the second chamber, denoted at 254, stores a color liquid developer 256 for developing an image. A pump 258 disposed in the first chamber 250 is connected through a supply pipe 260 to the inlet port 212b of the development device 4. A pump 262 disposed in the second chamber 254 is connected through a supply pipe 264 to the inlet port 212a of the development device 4. A pump 266 for supplying the black liquid developer from the liquid developer tank 29 is connected by a supply pipe 268 to the inlet port 212c of the development device 4.

A single outlet pipe 270 coupled to the liquid retrieval port 409a of the development device 4 is connected to an electrically-operated three-way switching valve 272. The three-way switching valve 272 has an outlet connected to a retrieval pipe 274 with its lower open end disposed over the liquid developer tank 29, and another outlet connected to a retrieval pipe 276 opening over the first chamber 250. The third outlet of the three-way switching valve 272 is connected to a retrieval pipe 278 opening over the second chamber 254.

The cleaning device 8 is coupled to the cleaning tank 202 in the same manner as that of the arrangement of FIG. 15.

Before developing a latent image on the photosensitive drum 1 with the color liquid developer 256 contained in the second chamber 254, the development device 4 is cleaned by the cleaning solution 252 stored in the first chamber 250. Therefore, any residual liquid developer of another color in the development device 4 is collected in the first chamber 250, and is not mixed in the liquid developer in the second chamber 254. The cleaning solution 252 may be a toner carrier or a liquid developer of the same color and concentration as those of the color liquid developer 256.

The openings of the disposable tank T5 should be hermetically closable.

Figure 19:
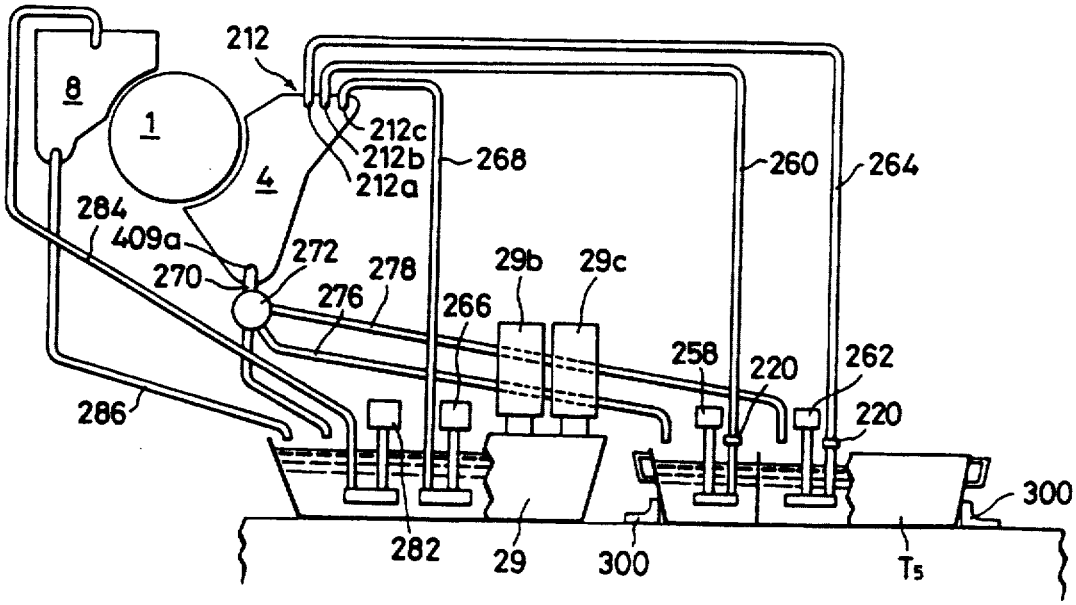

13. Recirculation system 6: (FIG. 19)

This structure is a modification of the arrangemetn of FIG. 18. The cleaning tank 202 of FIG. 18 is dispensed with, and a black liquid developer 280 is used as a cleaning solution. The cleaning device 8 is supplied with the black liquid developer 280 as the cleaning solution from the liquid developer tank 29 by a pump 282 through a supply pipe 284. The black liquid developer 280 can be retrieved through a retrieval pipe 286 to the liquid developer tank 29. The other structural details are the same as those shown in FIG. 18.

14. Recirculation system 7: (FIGS. 20 through 26)

Figure 20:
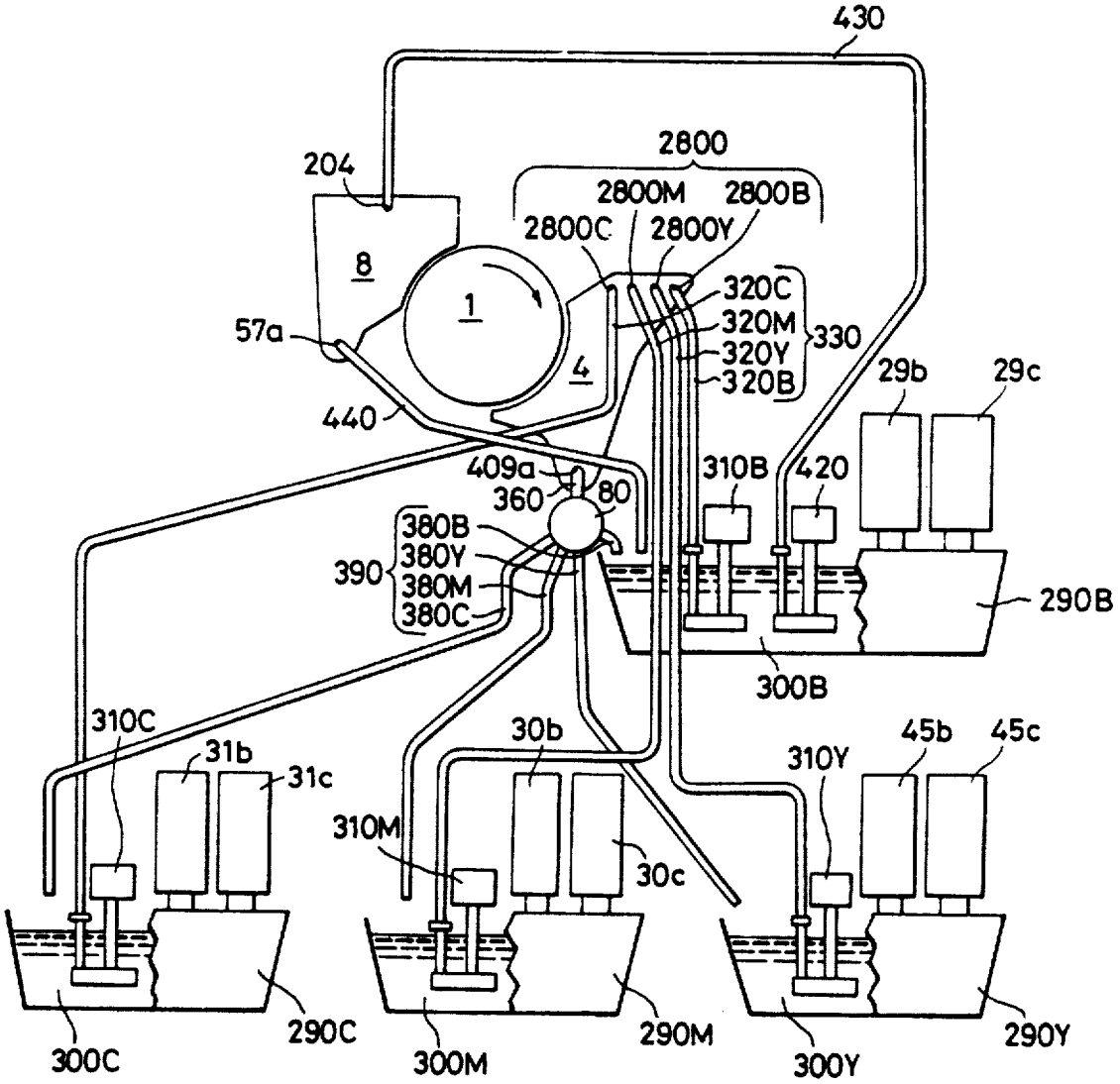

As illustrated in FIG. 20, the development device 4 has four inlet ports 2800B, 2800C, 2800M, 2800Y. The inlet port 2800B is connected via a supply pipe 320B to a pump 310B for delivering a black liquid developer 300B from a liquid developer tank 290B. The inlet port 2800C is connected via a supply pipe 320C to a pump 310C for delivering a cyan liquid developer 300C from a liquid developer tank 290C. The inlet port 2800M is connected via a supply pipe 320M to a pump 310M for delivering a magenta liquid developer 300M from a liquid developer tank 290M. The inlet port 2800Y is connected via a supply pipe 320Y to a pump 310Y for delivering a yellow liquid developer 300Y from a liquid developer tank 290Y. The supply pipes 320B, 320C, 320M, 320Y are collectively referred to as a supply pipe system 330.

Each of the liquid developers comprise a highly insulative toner carrier and a colored toner dispersed in the toner carrier. More specifically, the liquid developer 300B is a mixture of a black toner in a toner bottle 29b and a toner carrier in a toner carrier bottle 29c. The liquid developer 300C is a mixture of a cyan toner in a toner bottle 31b and a toner carrier in a toner carrier bottle 31c. The liquid developer 300M is a mixture of a magenta toner in a toner bottle 30b and a toner carrier in a toner carrier bottle 30c. The liquid developer 300Y is a mixture of a yellow toner in a toner bottle 45b and a toner carrier in a toner carrier bottle 45c.

The liquid retrieval port 409a of the developement device 4 is connected to a single outlet pipe 360 coupled to an electrically-operated four-way switching valve 80.

The four-way switching valve 80 has four outlets respectively connected to a retrieval pipe 380B opening over the liquid developer tank 290B, to a retrieval pipe 380C opening over the liquid developer tank 290C, to a retrieval pipe 380M opening over the liquid developer tank 290M, and to a retrieval pipe 380Y opening over the liquid developer tank 290Y. The retrieval pipes 380B, 380C, 380M, 380Y are collectively referred to as a retrieval pipe system 390.

The cleaning device 8 has an inlet port 204 for supplying a cleaning solution and a retrieval port 57a for discharging the cleaning solution supplied from the inlet port 204. The inlet port 204 is coupled through a supply pipe 430 to a pump 420 which discharges the black liquid developer 300B from the liquid developer tank 290B. The retrival port 57a is coupled to a retrieval pipe 440 opening over the liquid developer tank 290B. Since the black liquid developer 300B is used as the cleaning solution, no tank is necessary for storing a dedicatged cleaning solution.

Figure 21:
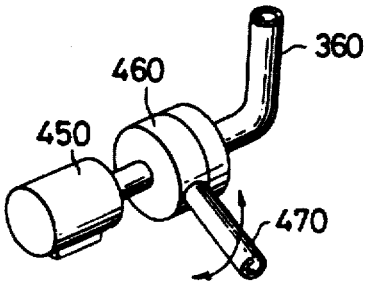
FIG. 21 is a perspective view of a mechanism for swinging an outlet pipe.

FIG. 21 shows a modified mechanism for selectively connecting the outlet pipe 360 to the retrieval pipe system 390, the mechanism comprising a rotary solenoid 450 and a pivot joint 460. The outlet pipe 360 is connected through the pivot joint 460 to a swing pipe 470, which is angularly movable by the pivot joint 460 to positioned where the retrieval pipes 380B, 380, 380M, 380Y are open.

Figure 22:
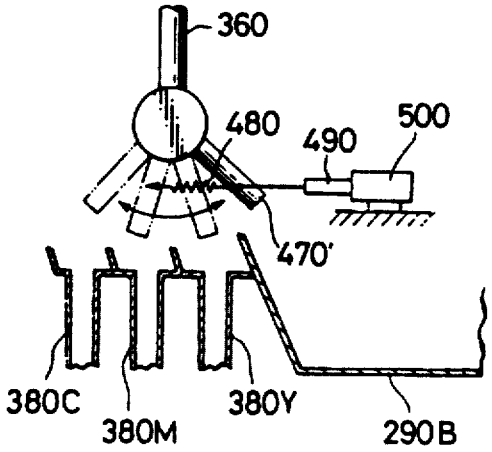
FIG. 22 is a side elevational view of a modified mechanism for swinging an outlet tube.

FIG. 22 illustrates another modification in which a swing pipe 470′ is coupled to the lower end of the outlet pipe 360 in communication therewith. The swing pipe 470′ is normally urged in one direction by a compression spring 480 and coupled to a plunger 490 which can displace the swing pipe 470′ in the direction opposite to the direction in which the swing pipe 470′ is urged by the spring 480. The plunger 490 is controlled by a solenoid 500 having a click-stop mechanism to move through stepped strokes. The open ends of the retrieval pipes 380C, 380M, 380Y, and the opening of the liquid developer tank 290B are located below the positions where the swing pipe 470′ can be stopped.

For developing a latent image with a desired one of the toner colors, the four-way switching valve 80, or the rotary solenoid 460, or the solenoid 500 is operated to select a desired recirculation passage by operating on the control section of the image forming apparatus in synchronism with selective operation of the pumps 310B, 310C, 310M, 310Y.

The control section has a control knob which can be moved to select one of the black copy mode, the cyan copy mode, the magenta copy mode, and the yellow copy mode, at a time.

Operation of these copy modes will be described below.

Figure 23:
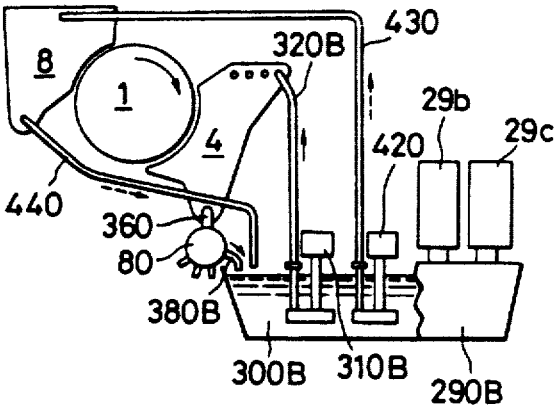
FIGS. 23 through 27 are side elevational views, partly cut away, of pipe systems by which developer containers, a cleaning device, and a cleaning solution tank.

[[]]Black copy mode[[]] (FIG. 23)

This mode is selected by moving the control knob to the black copy mode position. As shown in FIG. 23, the four-way switching valve 80 is shifted to communicate with the retrieval pipe 380B, and at the same time the pumps 310B, 420 are operated.

Therefore, the black liquid developer 300B is recirculated between the development device 4 and the liquid developer tank 290B for developing a latent image. The black liquid developer 300B is also recirculated as the cleaning solution between the cleaning device 8 and the liquid developer tank 290B.

In the black copy mode, the developed image is in black irrespectively of the color of the original image. As the liquid developer 300B is consumed, the toner and the toner carrier are automatically supplied from the toner bottle 29b and the toner carrier bottle 29c, respectively.

Figure 24:
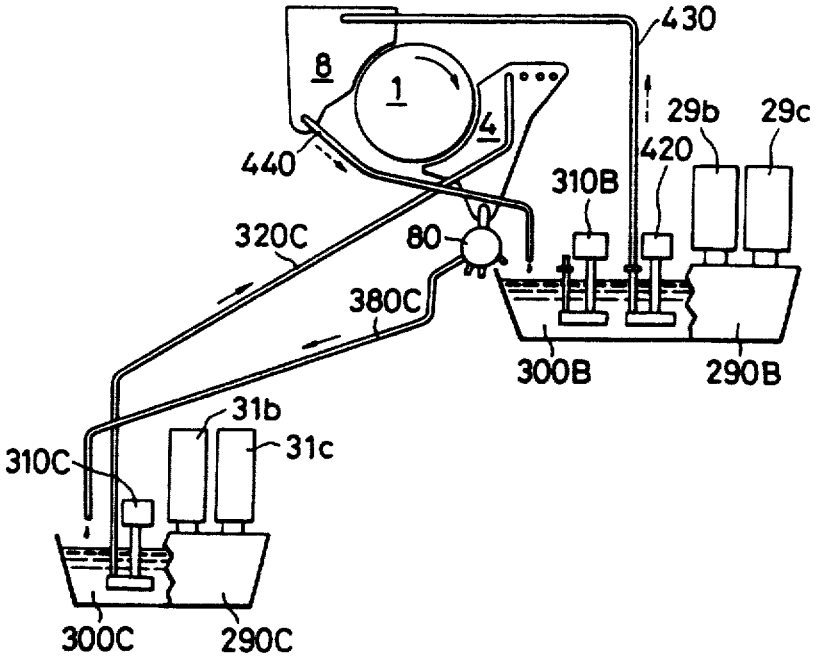

[[]]Cyan copy mode[[]] (FIG. 24)

This mode is selected by moving the control knob to the cyan copy mode position. As shown in FIG. 24, the four-way switching valve 80 is shifted to communicate with the retrieval pipe 380C, and at the same time the pumps 310C, 420 are operated.

Therefore, the cyan liquid developer 300C is recirculated between the development device 4 and the liquid developer tank 290C for developing a latent image. The black liquid developer 300B is also recirculated as the cleaning solution between the cleaning device 8 and the liquid developer tank 290B.

In the black copy mode, the developed image is in cyan irrespectively of the color of the original image.

If another copy mode has been effected before the cyan copy mode is selected, a small amount of liquid developer of a color other than cyan remains in the development device 4 and flows through the retrieval pipe 380C into the liquid developer tank 290C, resulting in color mixing. However, the degree of color mixing produced by one mode change is so small that no substantially color change will be caused. If the modes are changed frequently, however, the extent of color mixing will be increased. Nevertheless, color mixing imposes no substantial problem on many colored images which are practically acceptable, especially, monochromatic colored images which are developed in single colors. Some colors, yellow for example, appear to allow images to be clearly distinguished when mixed with other colors.

As more images are developed in the cyan copy mode after a mode change, the color mixture in the liquid developer 300C is consumed and the cyan toner is supplied from the toner bottle 31b. Therefore, the color mixing is gradually reduced so that the color cyan is purified by itself.

The current trend in electrophotographic reproduction is that most copied images are in black and colored images are copied much less frequently. In view of this tendency, the frequency of mode changes in low, and hence no substantial problem results from the color mixing.

The cleaning device 8 clears away the residual cyan toner from the photosensitive drum 1 with the black liquid developer 300B, which is retrieved through the retrieval pipe 440 to the liquid developer tank 290B. The cyan toner mixed in the black liquid developer 300B does not impair the reproducibility of images in black in the black copy mode.

Since part of the liquid developer 300C flows through the retrieval pipe 400 into the liquid developer tank 290B, the liquid developer may overflow the liquid developer tank 290B and smear the surroundings if the cyan copy mode continues. To avoid this shortcoming, an auxiliary tank (not shown) may be added for storing the developer overflow. When the auxiliary tank is filled, then a sensor is activated to issue an alarm for stopping the image forming apparatus. After the auxiliary tank is emptied, the image forming apparatus is operated again to develop images successively. Alternatively, a liquid level indicator may be attached to the liquid developer tank 290B or the auxiliary tank.

The aforesaid ability to purify the toner color and the provision of the auxiliary tank hold true for the other copy modes which follow.

Figure 25:
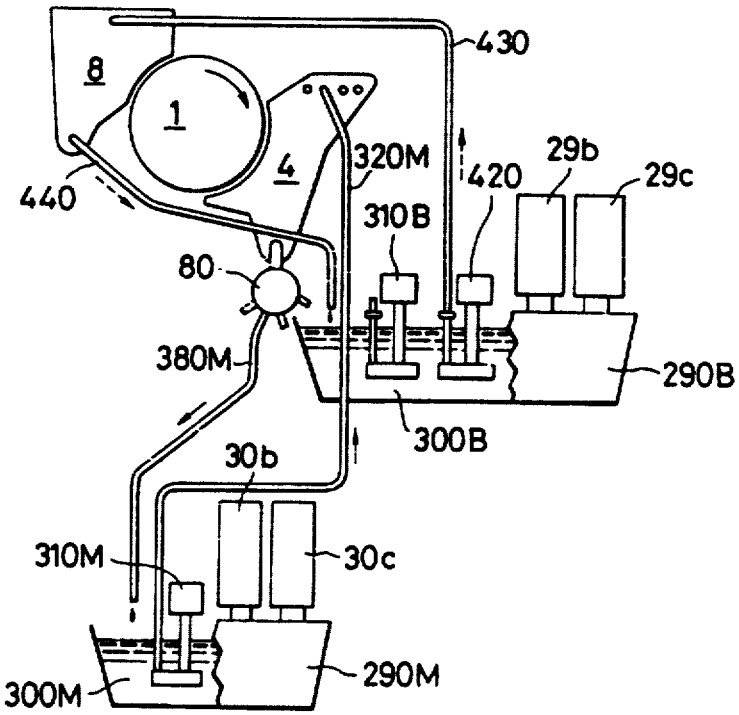

[[]]Magenta color mode[[]] (FIG. 25)

The magenta color mode is selected by moving the control knob to the magenta copy mode position. As shown in FIG. 25, the four-way switching valve 80 is shifted to communicate with the retrieval pipe 380M, and at the same time the pumps 310M, 420 are operated.

Therefore, the magenta liquid developer 300M is recirculated between the development device 4 and the liquid developer tank 290M for developing a latent image. The black liquid developer 300B is also recirculated as the cleaning solution between the cleaning device 8 and the liquid developer tank 290B.

In the magenta copy mode, the developed image is in magenta irrespectively of the color of the original image.

Figure 26:
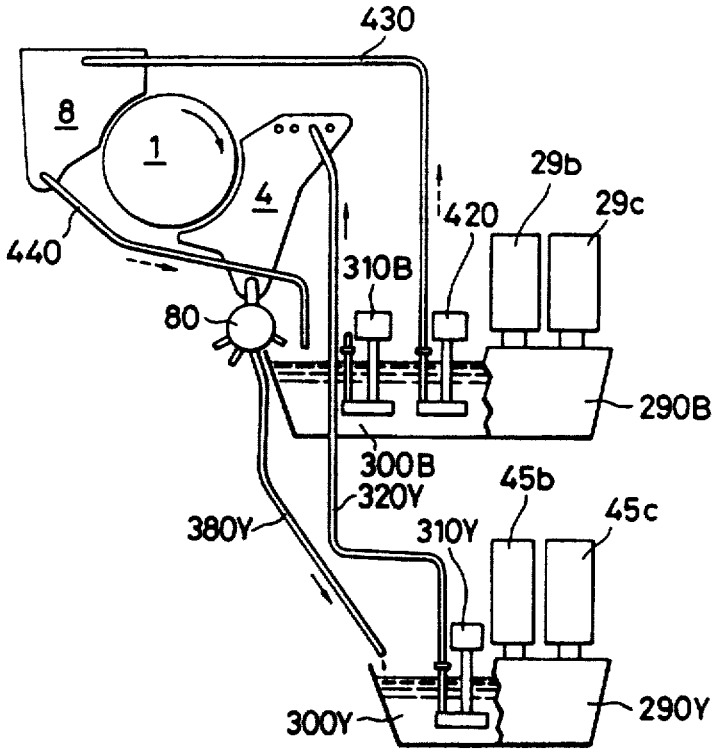

[[]]Yellow color mode[[]] (FIG. 26)

The yellow color mode is selected by moving the control knob to the yellow copy mode position. As shown in FIG. 26, the four-way switching valve 80 is shifted to communicate with the retrieval pipe 380Y, and at the same time the pumps 310Y, 420 are operated.

Therefore, the yellow liquid developer 300Y is recirculated between the development device 4 and the liquid developer tank 290Y for developing a latent image. The black liquid developer 300B is also recirculated as the cleaning solution between the cleaning device 8 and the liquid developer tank 290B.

In the yellow copy mode, the developed image is in yellow irrespectively of the color of the original image.

In each of the above four copy modes, a monochromatic color image can be developed in one of the four colors: black, cyan, magenta, and yellow. Furthermore, colored images or double-sided copies may be produced by these copy modes in the same manner as described above with respect to the fully colored copy mode or the double-sided copy mode.

With the conventional process, the development device has had to be moved when colors are to be changed, and it takes a certain period of time to get the image forming apparatus ready for copying images in a different color. Therefore, the prior image forming apparatus has been incapable of quickly forming color images.

According to the above arrangement of the invention, however, toner colors can easily and quickly be changed simply by operating the control knob to select a desired liquid developer recirculation passage. In addition, no dedicated cleaning solution tank is required and hence the space in the apparatus can be reduced because the black liquid developer doubles as the cleaning solution.

15. Recirculation system 8: (FIG. 27)

Figure 27:
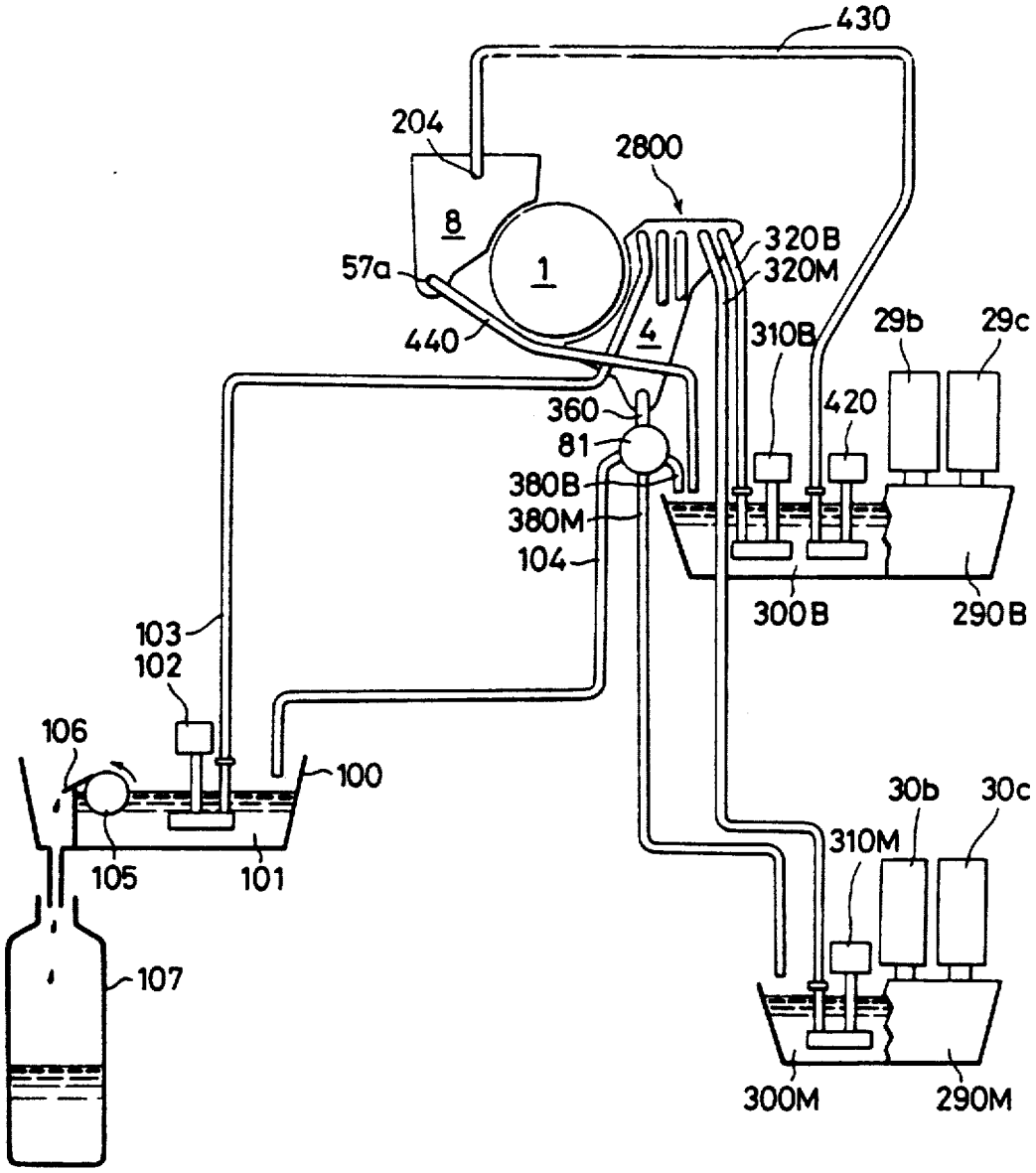

The arrangement of FIG. 27 is a modification of the embodiment shown in FIGS. 20 through 26, and additionally has a dedicated means for cleaning the development device 4.

The cleaning means comprises a cleaning solution tank 100 having a pump 102 for supplying a cleaning solution to the development device 4 through a supply pipe 103. The cleaning solution supplied to the development device 4 is retrieved through a retrieval pipe 104 to the cleaning solution tank 100. The outlet pipe 360 of the development device 4 is connected to a four-way switching valve 81.

Various color copy modes of the image forming apparatus shown in FIG. 27 will be described below.

[[]Black copy mode[]]

This mode is the same as the black copy mode described above with reference to FIG. 23.

[[]Color copy mode[]]

The control knob is moved to designate a color copy mode such as the magenta copy mode. In this mode, a recorded image is in magenta regardless of the color of the original image. If another copy mode has been effected before the magenta copy mode is selected, a small amount of liquid developer of a color other than magenta remains in the development device 4 and would flow through the retrieval pipe 380M into the liquid developer tank 290M, resulting in color mixing. To prevent such color mixing, the valve 81 is shifted to connect the development device 4 to the retrieval pipe 104 and the pump 102 is actuated before the apparatus enters the magenta color mode. The pump 102 is continuously activated for a prescribed period of time to supply the cleaning solution 101 to the development device 4 for washing away the remanent liquid developer, which flows through the retrieval pipe 104 into the cleaning solution tank 100.

Thereafter, the five-way switching valve 81 is shifted to connect the retrieval pipe 380M to the development device 4, and at the same time the pumps 420, 310M starts to operate to enter the magenta copy mode.

In the magenta copy mode, the magenta liquid developer 310M is recirculated between the development device 4 and the liquid developer tank 290M for image development. The residual toner on the photosensitive drum 1 is removed by the cleaning device 8 supplied with the black liquid developer 300B.

The apparatus operates in substantially the same way as described above in the cyan and yellow copy modes.

More specifically, when each of these copy modes is selected, the development device 4 is cleaned by the cleaning solution 101 for a given period of time, and then the apparatus automatically enters the selected copy mode. In the selected color copy mode, the cleaning device 8 is cleaned by the liquid developer 300B irrespectively of the selected color.

Therefore, each time a color copy mode is selected, the toner of the previously selected color flows into the cleaning solution tank 100. The amount of such mixed toner is however small as compared with the amount of toner retrieved by the cleaning device 8.

As the apparatus goes through more color copy modes, however, the cleaning solution 101 is gradually contaminated. The mixed toner can be separated from the cleaning solution 101 to purify the same by a toner processing means associated with the cleaning solution tank 100.

16. Toner processing means:

The toner processing means may be constructed as the following three designs:

(1) As shown in FIG. 27, the toner processing means comprises an electrode roller 105 to which a biasing voltage is applied to attract the toner. The toner attached to the electrode roller 105 is scraped off by a scraper 106 into a container 107. The toner collected in the container 107 may be recycled as desired.

(2) The cleaning solution tank 100 may have a porous member disposed on the bottom thereof. The porous member may be made of open-cell sponge. The toner which has settled through the cleaning solution 101 enters sponge cells and remains therein since it is not affected by the solution flow in the cleaning solution tank 100. The porous member is then removed and crumpled in a toner carrier to expel the toner into the toner carrier to form a liquid developer. The resultant liquid developer appears to be black due to color mixing.

The porous member may be replaced with a piece of pile fabric such as a Velcro (trademark) tape.

(3) A filter member such as of filter paper or active carbon may be attached to the outlet end of the retrieval pipe 104 for trapping any toner.

The cleaning solution in the cleaning solution tank 100 can be kept clean by the above toner processing means. The color liquid developer is also prevented from being mixed with another color liquid developer because the residual liquid developer used in the preceding mode is removed from the development device 4.

The remanent toner of a color in each color copy mode, which has been attached to the photosensitive drum 1, is washed away by the black liquid developer 300B, and retrieved through the retrieval pipe 440 to the liquid developer tank 290B. The toner mixed in the black liquid developer 300B however does not lower the reproducibility of images in black in the black copy mode.

Since part of the liquid developer 300M flows through the retrieval pipe 440 into the liquid developer tank 290B, the liquid developer may overflow the liquid developer tank 290B and smear the surroundings if the magenta copy mode continues. To avoid this shortcoming, an auxiliary tank (not shown) may be added for storing the developer overflow. When the auxiliary tank is filled, then a sensor is activated to issue an alarm for stopping the image forming apparatus. After the auxiliary tank is emptied, the image forming apparatus is operated again to develop images successively. The use of the auxiliary tank is advantageous in that the liquid developer 290B may be reduced in size. Alternatively, a liquid level indicator may be attached to the liquid developer tank 290B or the auxiliary tank.

By changing the color copy modes, a monochromatic color copy in any selected one of the four colors: black, cyan, magenta, and yellow can be produced.

Fully colored images of two-color images may be produced by placing a color separation filter device in the exposure optical path and operating the color separation filter device in synchronism with switching among the color copy modes.

Although certain preferred embodiments have been shown and described, it should be understood that many changes and modifications may be made therein without departing from the scope of the appended claims.

What is claimed is:

1. An apparatus for forming multicolor electrophotographic images through a wet-type developing process, comprising:

a latent image carrier [rotatable in one direction about its own axis];

charging means for charging said latent image carrier;

an optical system for forming an electrostatic latent image on said latent image carrier;

a rotatable development body disposed adjacent to said latent image carrier and rotatable in one direction for supplying a developer to said latent image carrier to visualize a latent image formed on the latent image carrier;

a development housing in which said rotatable development body is rotatably accommodated;

a plurality of developer tanks for storing developers of different colors, respectively;

developer supply means for selectively supplying the developer from one of said developer tanks to said development housing and for returning the developer having developed the image to said one of the developer tanks;

transfer means for transferring the visible image from said latent image carrier to an image transfer sheet;

a sheet feeder device for feeding the image transfer sheet to said latent image carrier;

a first cleaning device for removing the residual developer from said latent image carrier after the visible image has been transferred therefrom; and a second cleaning device for supplying a cleaning solution to said development housing to clean the development housing and said rotatable development body.

2. An apparatus according to claim 1, wherein said latent image carrier comprises a photosensitive drum.

3. An apparatus according to claim 1, wherein said charging means comprises a charger fixed in the vicinity of the circumferential surface of said latent image carrier.

4. An apparatus according to claim 1, wherein said optical system includes a transparent tape for placing an original document thereon, first through third movable mirrors, a projector lens, a fixed mirror, and a color separation filter device.

5. An apparatus according to claim 4, wherein said color separation filter device is positioned on an optical path between said fixed mirror and said latent image carrier, and comprises a red filter capable of transmitting red and white light, a green filter capable of transmitting green and white light, said color separation filter device being rotatable about its own axis for selectively positioning said red, green, and blue filters on said optical path.

6. An apparatus according to claim 1, wherein said rotatable development body comprises a roller rotatably supported in said dvelopment housing in the vicinity of said latent image carrier.

7. An apparatus according to claim 6, wherein said rotatable development body comprises a plurality of rollers arranged vertically as a first development roller, a second development roller, and a squeeze roller in the order named downwardly.

8. An apparatus according to claim 7, wherein said first and second development rollers are rotatable in the same direction as that of rotation of said latent image carrier and in the direction opposite to that of rotation of said squeeze roller, at positions where said first and second development rollers confront said latent image carrier and said squeeze roller.

9. An apparatus according to claim 8, including a plurality of scrapers held against said first development roller, said second development roller, and said squeeze roller.

10. An apparatus according to claim 9, including a scraper held against the circumferential surface of said second development roller for guiding the developer toward a gap between said latent image carrier and said squeeze roller.

11. An apparatus according to claim 9, including a nozzle disposed between said second development roller and said squeeze roller for supplying the liquid developer to the gap between said latent image carrier and said squeeze roller.

12. An apparatus according to claim 10, wherein said first development roller is dispensed with.

13. An apparatus according to claim 11, wherein said first development roller is dispensed with.

14. An apparatus according to claim 9, wherein said latent image carrier and said second development roller are rotatable at speeds V1, V3, respectively, said speeds V1, V3 meeting the relationship: $V1 \geqq V3$.

15. An apparatus according to claim 14, wherein the ratio between the speeds of rotation of said latent image carrier and said second development roller ranges from 1:1 to 4:1.

16. An apparatus according to claim 1, wherein said development housing has an inlet port defined in its upper portion for supplying a liquid therethrough into said development housing and an outlet port defined in its lower portion for discharging the liquid therethrough from said development housing, said development housing being disposed in confronting relation to said latent image carrier.

17. An apparatus according to claim 1, wherein said developer tanks are permanently attached to a frame of said apparatus.

18. An apparatus according to claim 17, wherein each of said developer tanks has a toner bottle for storing a color of one color and a solvent tank for storing a toner carrier.

19. An apparatus according to claim 1, wherein at least one of said developer tanks comoprises a disposable tank detachably attached to a frame of said apparatus.

20. An apparatus according to claim 19, wherein said disposable tank has a single chamber for storing a premixed developer composed of a toner of one color and a toner carrier which are mixed at a ratio selected for developing the latent image.

21. An apparatus according to claim 19, wherein said disposable tank has two single chambers, one for storing a premixed developer composed of a toner of one color and a toner carrier which are mixed at a ratio selected for developing the latent image, and the other for storing a toner carrier.

22. An apparatus according to claim 1, wherein said developer supply means comprises a pump disposed in each of said developer tanks, a liquid supply pipe connecting said pump and said development housing to each other, and a liquid retrieval pipe connecting said development housing and said developer tank to each other.

23. An apparatus according to claim 22, including switching means for providing selective communication between said developer tanks and said development device through the liquid retrieval pipes.

24. An apparatus according to claim 23, wherein said switching means comprises a directional control valve.

25. An apparatus according to claim 23, wherein said switching means has a swing pipe angularly movable about an end of said development housing for selective communication with said liquid retrieval pipes.

26. An apparatus according to claim 21, wherein said developer supply means is disposed in each of said chambers.

27. An apparatus according to claim 26, wherein said chambers are divided by a partition, said developer supply means comprises a pump disposed in each of said chambers, a liquid supply pipe connecting said pump and said development housing to each other, and a liquid retrieval pipe connecting said development housing and said developer tank to each other.

28. An apparatus according to claim 27, including switching means for providing selective communication between said developer tanks and one of said chambers, and said development device through the liquid retrieval pipes.

29. An apparatus according to claim 28, wherein said switching means comprises a directional control valve.

30. An apparatus according to claim 28, wherein said switching means has a swing pipe angularly movable about an end of said development housing for selective communication with said liquid retrieval pipes.

31. An apparatus according to claim 1, wherein said transfer means comprises a transfer charger fixed in the vicinity of the circumferential surface of said latent image carrier.

32. An apparatus according to claim 1, wherein said sheet feeder device comprises a sheet cassette, a mechanism for separating and feeding image transfer sheets one by one from said sheet cassette, a pair of feed rollers, a pair of register rollers, a second sheet cassette, and a mechanism for separating and feeding image transfer sheets one by one from said second sheet cassette.

33. An apparatus according to claim 1, wherein said first cleaning device comprises a casing detachably mounted on a frame of said apparatus, a cleaning roller disposed in said casing and mounted by a bracket on said frame, a cleaning blade disposed in said casing and having a free end pressable against said latent image carrier, a squeeze roller held against said cleaning roller, a dispersing plate for dispersing a cleaning solution, and a supply nozzle for supplying the cleaning solution.

34. An apparatus according to claim 33, wherein said bracket is pivotally attached to said frame for angular movement between different positions while and after said latent image carrier is cleaned.

35. An apparatus according to claim 33, wherein said cleaning roller is made of a liquid-absorbing resilient material and rotatably supported on said bracket, said cleaning roller being pressable against said latent image carrier when it is cleaned and separable therefrom after it is cleaned.

36. An apparatus according to claim 35, including a drive mechanism for rotating said cleaning roller.

37. An apparatus according to claim 33, wherein said cleaning blade comprises a resilient plate having its end supported on said bracket.

38. An apparatus according to claim 33, wherein said squeeze roller is pressed against said cleaning roller to elastically deform the same, including a drive mechanism for rotating said squeeze roller.

39. An apparatus according to claim 33, wherein said first cleaning device includes a scraper held against said squeeze roller.

40. An apparatus according to claim 33, wherein said dispersing plate has a pivotally supported end and an opposite free end held by gravity against an upper circumferential surface of said cleaning roller.

41. An apparatus according to claim 40, wherein said opposite free end of the dispersing plate is lower than the pivotally supported end thereof.

42. An apparatus according to claim 33, wherein said supply nozzle is positioned upwardly of said dispersing plate.

43. An apparatus according to claim 42, including a cleaning solution tank for storing a dedicated cleaning solution, said cleaning solution tank having a first pump for supplying the cleaning solution therefrom, one of said developer tanks having a second pump for supplying a black developer therefrom, said supply nozzle being connected through a liquid supply pipe to said first or second pump.

44. An apparatus according to claim 33, wherein said casing has a retrieval port defined in a lower end thereof for retrieving the cleaning solution supplied to said casing.

45. An apparatus according to claim 44, including a cleaning solution tank for storing a dedicated cleaning solution, one of said developer tanks being adapted to store a black developer therein, said retrieval port being connected through a liquid retrieval pipe to said cleaning solution tank or said one of the developer tanks.

46. An apparatus according to claim 45, wherein said cleaning tank has toner processing means.

47. An apparatus according to claim 46, wherein said toner processing means comprises an electrode roller immersible in said cleaning solution for electrically attracting toner in the cleaning solution under a biasing voltage applied to the electrode roller, a scraper held against said electrode roller for scraping t he toner off said electrode roller, and a container for accommodating the toner scraped off said electrode roller.

48. An apparatus according to claim 46, wherein said toner processing means comprises a porous member mounted on the bottom of said cleaning solution tank.

49. An apparatus according to claim 46, wherein said toner processing means comprises a filter member mounted on an outlet end of said liquid retrieval pipe.

* * * * *